United States Patent
Ghosh et al.

(10) Patent No.: US 9,960,933 B2
(45) Date of Patent: May 1, 2018

(54) METHODS AND SYSTEMS FOR ADAPTIVE AND CONTEXT AWARE INTER-INTERNET OF THINGS (IOT) COMMUNICATION

(71) Applicant: Wipro Limited, Bangalore (IN)

(72) Inventors: Sudipta Ghosh, Kolkata (IN); Swaminathan Seetharaman, Chennai (IN)

(73) Assignee: Wipro Limited, Bangalore (IN)

( * ) Notice: Subject to any disclaimer, the term of this patent is extended or adjusted under 35 U.S.C. 154(b) by 121 days.

(21) Appl. No.: 15/258,798

(22) Filed: Sep. 7, 2016

(65) Prior Publication Data

US 2017/0195136 A1 Jul. 6, 2017

(30) Foreign Application Priority Data

Dec. 30, 2015 (IN) .......................... 7088/CHE/2015

(51) Int. Cl.
*H04L 12/26* (2006.01)
*H04L 12/66* (2006.01)
*H04L 29/08* (2006.01)

(52) U.S. Cl.
CPC .............. *H04L 12/66* (2013.01); *H04L 67/12* (2013.01)

(58) Field of Classification Search
CPC .......... H04L 45/22; H04L 12/66; H04L 67/12
See application file for complete search history.

(56) References Cited

U.S. PATENT DOCUMENTS

2005/0037751 A1* 2/2005 Kim ....................... H04L 12/66
455/432.1
2017/0063605 A1* 3/2017 Cheng .................. H04L 41/0668

OTHER PUBLICATIONS

Bontu et al., "Wireless Wide-Area Networks for Internet of Things: An Air Interface Protocol for IoT and a Simultaneous Access Channel for Uplink IoT Communication", Magazine, Jan. 31, 2014, 3 pages, IEEE.
"3rd Generation Partnership Project; Technical Specification Group Radio Access Network; Study on LTE Device to Device Proximity Services; Radio Aspects", Technical Report 36.843, Mar. 2014, 50 pages, Release 12, v12.0.1, 3GPP Organizational Partners.

(Continued)

*Primary Examiner* — Kevin C Harper
(74) *Attorney, Agent, or Firm* — LeClairRyan PLLC

(57) ABSTRACT

A method for managing communication in a plurality of Internet of Things (IoT) networks includes receiving a communication request initiated by an IoT device in one of the plurality of IoT networks for a destination IoT device located in one of the plurality of IoT networks. Suitability of an existing communication session between the IoT device and the destination IoT device is determined. Based on determining unsuitability of the existing communication session, a new communication session between the IoT device and the destination IoT device is selectively initiated. In response to determining suitability of the existing communication session, the existing communication session for the communication request is selectively reused. At least one initiating cause for a communication event and associated resolutions on occurrence of the communication event to maintain one of the new communication session and the existing communication session that is suitable is iteratively determined.

27 Claims, 10 Drawing Sheets

(56) References Cited

OTHER PUBLICATIONS

Jeong et al., "Enabling Transparent Communication with Global ID for the Internet of Things", Jul. 4-6, 2012, pp. 695-701, vol. 00, IEEE.
Gundlach, "Overview of D2D Proximity Services Standardization in 3GPP LTE", Jun. 23, 2014, pp. 1-19, Nokia.
"3rd Generation Partnership Project; Technical Specification Group Services and System Aspects; System Improvements for Machine-Type Communications", Sep. 2012, pp. 1-165, V11.0.0, 3GPP Organizational Partners.
Roussos et al., "Scalable ID/Locator Resolution for the IoT", Oct. 2011, pp. 1-9.
Dhillon et al., "Wireless Wide-Area Networks for Internet of Things: An Air Interface Protocol for IoT and a Simultaneous Access Channel for Uplink IoT Communication", Magazine, Jan. 31, 2014, 3 pages, IEEE.
Evans, "The Internet of Things How the Next Evolution of the Internet Is Changing Everything", Apr. 2011, pp. 1-11, Cisco.

* cited by examiner

METHODS AND SYSTEMS FOR ADAPTIVE AND CONTEXT AWARE INTER-INTERNET OF THINGS (IOT) COMMUNICATION

This application claims the benefit of Indian Patent Application Serial No. 7088/CHE/2015 filed Dec. 30, 2015, which is hereby incorporated by reference in its entirety.

FIELD

This disclosure relates generally to Internet of Things (IoT) networks and more particularly to methods and systems for adaptive and context-aware IoT communication.

BACKGROUND

In this ever interconnected world, by 2020, there would be 50 billion potentially connected devices, while the human population is expected to be around 7.6 billion. Considering that approximately 60% of the population has one or more connected devices, the average connected devices per user may be expected to be at least ten. In some cases, as in a command center, the number of devices linked to a single user may even exceed 100. Such phenomenal numbers of connected devices require massive, ultra-dense and hybrid wireless networks including accesses like Wi-Fi, macro cellular networks, small cells and their variants, peer-to-peer communication such as Bluetooth, infra-red, and other low-power local access networks. Further, each set of connected devices may form their own Internet of Things (IoT) network, requiring communication within the nodes in the IoT network, and to other IoT networks which may be different in nature (based on services, topology, communication protocols, connectivity, etc.), and also may be located geographically far apart.

Such arrangement of massive interconnected devices imposes numerous constraints and challenges, such as, assignment and maintenance of identity of each IoT device in the network, maintenance of connections and different sessions for each IoT device, IoT network-context-aware communication within and across various types of IoT networks while keeping the communication overheads within limits, maintenance of connections across heterogeneous devices while maintaining mobility of the IoT devices, and fulfillment of security, reliability, priority and criticality of devices and their diverse communication needs. Moreover, in an IoT application scenario, existing communication network will need to maintain a large number of device-specific connections and sessions for each IoT subscriber (a subscriber who has a set of connected IoT devices). This will be overhead for the network and for the IoT subscriber as well.

One of the conventional systems tries to solve the above problems by providing the following solutions: IoT device connectivity to mobile network may be enabled through IoT module in UE (Mobile User Device/User Equipment), IoT server and IoT device may communicate with pre-registered channel id, and each IoT device may be attached to an exclusive channel and each channel would always needs to stay on. However, this conventional system has many limitations that include: all IoT devices may not have the capability to run the IoT module, over-dependence on UE (single point of failure) for initial registration and resource allocation, lack of scalability (as a smartphone may not be able to cater to a lot of devices in a timely manner), and downloading of the IoT module on the devices may also be considerably delayed.

Another conventional system proposes an IPv6 scheme of addressing for Machine-Type Communications (MTC), and decoupling the MTC server from 3GPP network architecture. However, the proposed mechanism is based on the MTC-InterWorking Function (MTC-IWF) and fails to describe a mechanism that addresses aspects such as communication between IoT devices across different IoT networks. The system has additional limitations that include: unsuitability for real-time and critical communications, limited connectivity options and unavailability of alternate mechanisms for critical or priority communication during abnormal conditions, additional resource required for setting up of appropriate channel (which may introduce additional delay and scalability problems), and failure to provide support for multiple connectivity options.

SUMMARY

In one embodiment, method for managing communication in a plurality of Internet of Things (IoT) networks is disclosed. The method includes receiving a communication request initiated by an IoT device in one of the plurality of IoT networks for a destination IoT device located in one of the plurality of IoT networks; determining suitability of an existing communication session between the IoT device and the destination IoT device; selectively initiating, based on determining unsuitability of the existing communication session, a new communication session between the IoT device and the destination IoT device, wherein initiating the new communication session comprises: finalizing an IoT Gateway (IoTGW) for IoT network of the IoT device based on comparison of a set of gateway parameters with associated thresholds within a set of IoTGW thresholds in response to receiving a communication request; determining priority, criticality, and resource requirement of the destination IoT device for the communication request based on a purpose of the communication request; finalizing an Inter-Connect Gateway (ICGW) for the IoT network of the IoT device to communicate with the IoTGW based on comparison of a set of communication parameters with associated thresholds within a set of ICGW thresholds, wherein the ICGW communicates with a set of IoTGW's; and establishing the new communication session between the ICGW and the destination IoT device on a communication channel based on the priority and the criticality determined for the communication request; selectively reusing, in response to determining suitability of the existing communication session, the existing communication session for the communication request; iteratively determining at least one initiating cause for a communication event and associated resolutions on occurrence of the communication event to maintain one of the new communication session and the existing communication session that is suitable; and implementing a self-learning mechanism to improve the quality of future communication sessions.

In another embodiment, a system managing communication in a plurality of IoT networks is disclosed. The system includes at least one processor and a memory. The memory stores instructions that, when executed by the at least one processor, cause the at least one processor to perform operations that include receiving a communication request initiated by an IoT device in one of the plurality of IoT networks for a destination IoT device located in one of the plurality of IoT networks; determining suitability of an existing communication session between the IoT device and the destination IoT device; selectively initiating, based on determining unsuitability of the existing communication session, a new communication session between the IoT device and the destination IoT device, wherein initiating the new communication session comprises: finalizing an IoTGW for IoT network of the IoT device based on comparison of a set of gateway parameters with associated thresholds within a set of IoTGW thresholds in response to receiving a communication request; determining priority, criticality, and resource requirement of the destination IoT device for the communication request based on a purpose of the communication request; finalizing an ICGW for the IoT network of the IoT device to communicate with the IoTGW based on comparison of a set of communication parameters with associated thresholds within a set of ICGW thresholds, wherein the ICGW communicates with a set of IoTGW's; and establishing the new communication session between the ICGW and the destination IoT device on a communication channel based on the priority and the criticality determined for the communication request; selectively reusing, in response to determining suitability of the existing communication session, the existing communication session for the communication request; iteratively determining at least one initiating cause for a communication event and associated resolutions on occurrence of the communication event to maintain one of the new communication session and the existing communication session that is suitable; and implementing a self-learning mechanism to improve the quality of future communication sessions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
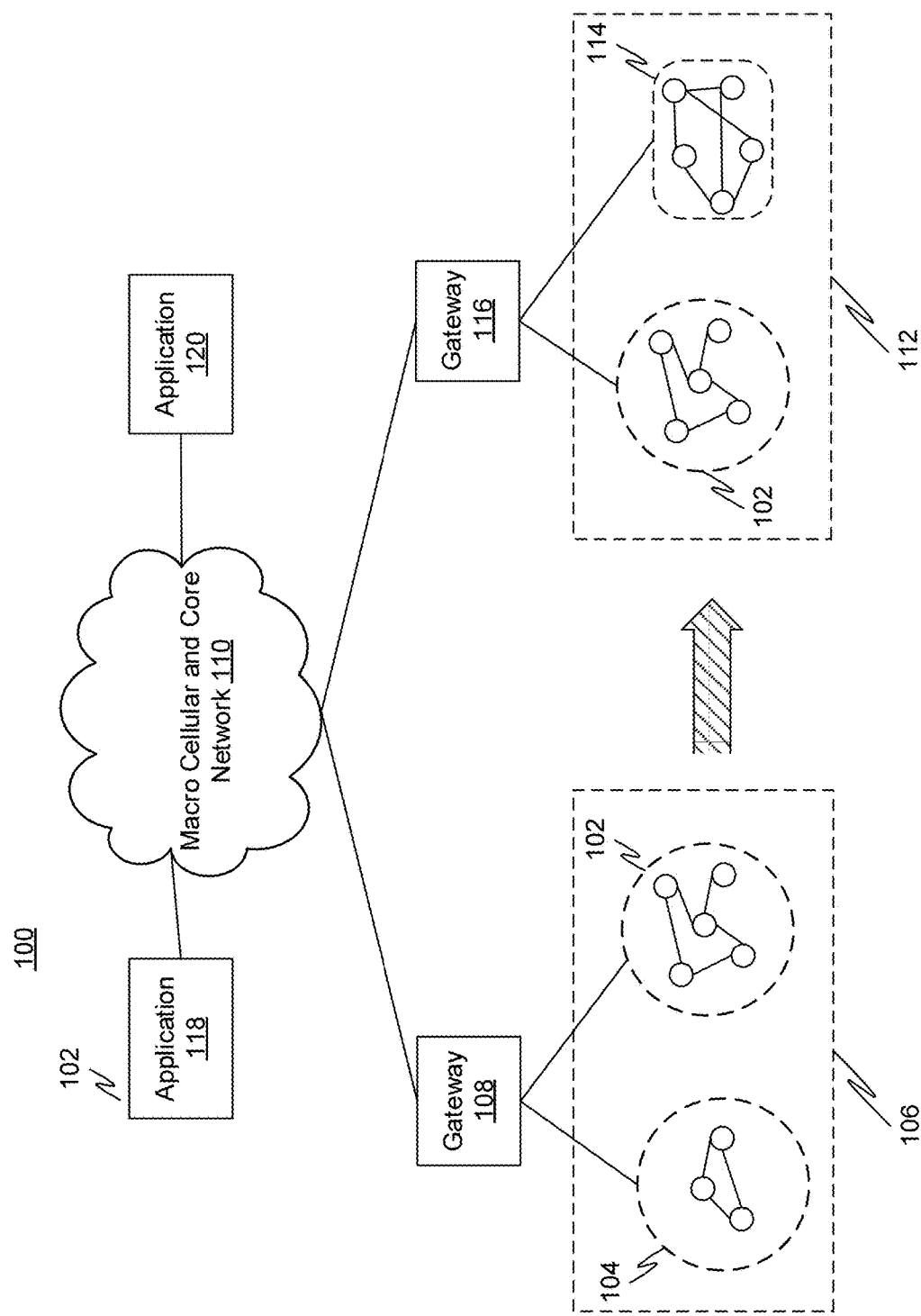
FIG. 1 illustrates an environment (that is exemplary) in which various embodiments may function.

Additional illustrative embodiments are listed below. In one embodiment, an environment 100 (that is exemplary) in which various embodiments may function is illustrated in FIG. 1. Environment 100 includes a plurality of IoT device networks, such that each IoT device network is associated with an IoT subscriber. The plurality of IoT device networks may include a car IoT network 102 that is associated with owner of the car (in other words, an IoT subscriber) that may be moving from one point to another. Car IoT network 102 includes a plurality of car IoT devices. The plurality of IoT networks may also include a home IoT network 104 associated with one or more owners of the house. Home IoT network 104 also includes a plurality of home IoT devices.

At first time instant, car IoT network 102 is located at a location 106 that may be closer to home. For example, the car may be parked in a garage at the home. As a result both car IoT network 102 and home IoT network 104 communicate with a gateway 108, which enables communication between car IoT network 102 and home IoT network 104. Gateway 108 may be an IoT gateway or may be a smartphone. Alternatively, IoT device in each of car IoT network 102 and home IoT network 104 may directly communicate with a Macro cellular and Core Network (MCN) 110 without requiring gateway 108.

Subsequently, the car may move from location 106, which is closer to home, to a location 112 that may be a gas station. Location 112 also includes a gas station IoT network 114. Once the car is at location 112, car IoT network 102 communicates with MCN 110 and gas station IoT network 114 through a gateway 116. Gas station IoT 114 also communicates with MCN 110 through gateway 116. MCN 110 further is in communication with a plurality of IoT applications, for example, an IoT application 118 and an IoT application 120.

The connectivity of different IoT networks facilitated through gateways and MCN 110 enables immediate resolution of any issue that is detected by one or more IoT device in any one of these IoT networks, for example, cart IoT network 102. For example, the car may have one or more issues that may or may not be critical and need to be fixed either immediately or at a service station at a certain distance from the car. The issues detected by car IoT network 102 may include, but are not limited to impending collision with another vehicle, heated up engine, almost empty petrol tank, low air pressure in a tyre, non-critical service request, and reminder for periodic car maintenance service. In a similar manner, issues detected by home IoT network 104 may include renewal of subscription for a channel in the in-house entertainment system, a gas leak, a fire alarm going off, and leakage of water.

Figure 2:
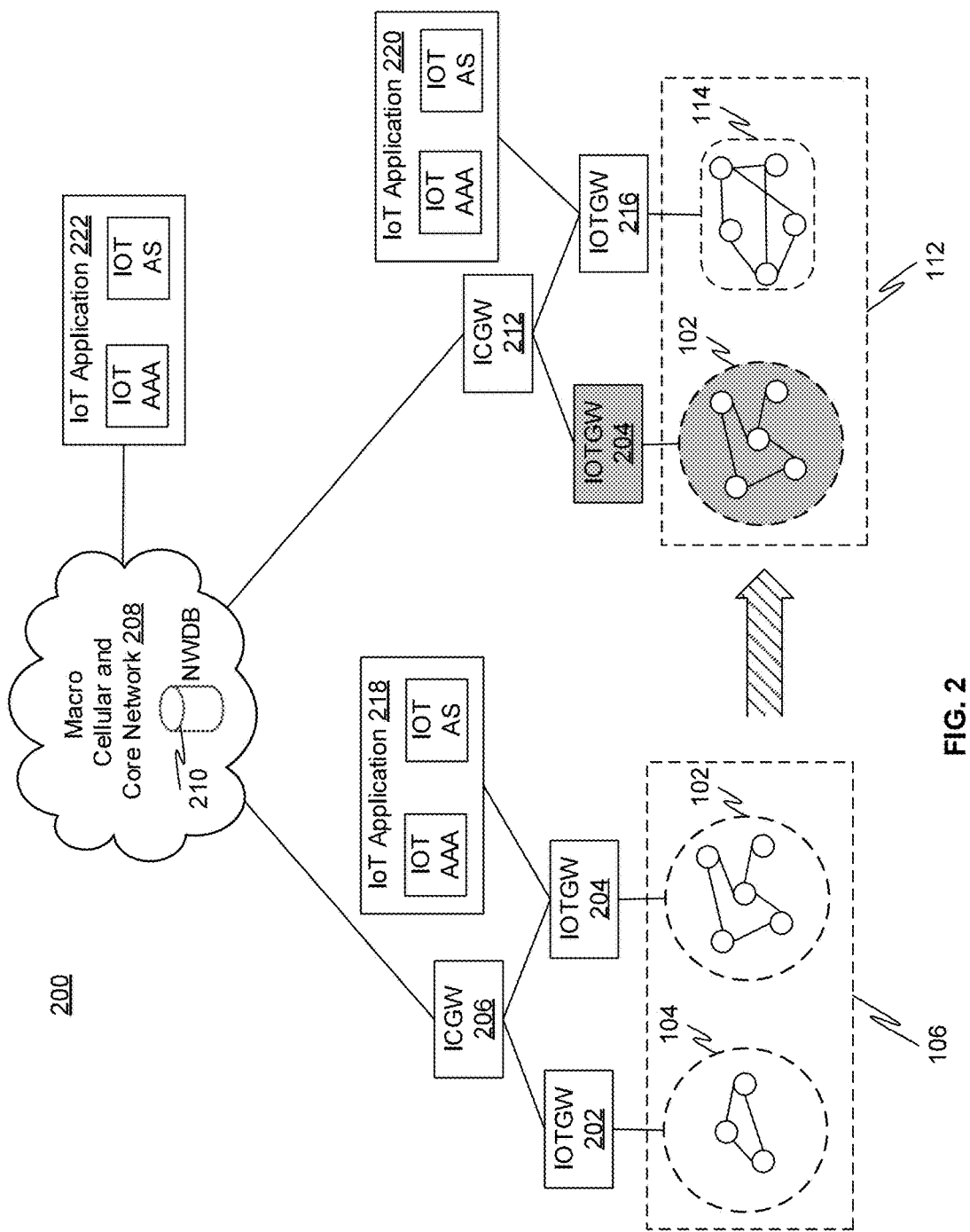
FIG. 2 illustrates network level interactions between various components of an Internet of Things (IoT) system, in accordance with an embodiment.

Referring now to FIG. 2, network level interactions between various components of an Internet of Things (IoT) system 200 is illustrated, in accordance with an embodiment. IoT system 200 includes a plurality of IoT networks, i.e., car IoT network 102, home IoT network 104, and a gas station IoT network 114. At location 106, home IoT network 104 is communicatively coupled to an IoT Gateway (IoTGW) 202 and car IoT network 102 is communicatively coupled to an IoTGW 204. Communication between car IoT network 102 and home IoT network 104 is facilitated through an Inter Connect Gateway (ICGW) 206, which is communicatively coupled to each of IoTGW 202 and IoTGW 204. ICGW 206 is also communicatively coupled to MCN 208 that includes a Network Wide DataBase (NWDB) 210. NWDB 210 in one instance can be part of MCN 208 or in another instance NWDB 210 can be associated with MCN 208. NWDB 210 may be a set of databases that is accessible by ICGWs and IoTGWs in IoT system 200. NWDB 210 may include IoT network profile that includes information such as, but not limited to device IDs, topology, home IoTGW, associated IoTGW, associated ICGW, home ICGW, encryption keys, and authentication vectors. An ICGW makes use of this IoT network profile to perform context-aware communication.

When car IoT network 102 moves from location 106 to location 112, IoTGW 204 moves along with car IoT network 102 which remains communicatively coupled to IoTGW 204. However, at location 112, IoTGW 204 is communicatively coupled to an ICGW 212. ICGW 212 connects IoTGW 204 with MCN 208 and an IoTGW 216, which is communicatively coupled to gas station IoT network 114. ICGW 212 thus enables communication of car IoT network 102 with MCN 208 and gas station IoT network 114.

IoT system 200 further includes one or more IoT Applications that are communicatively coupled to one of various components in IoT system 200. For example, an IoT application 218 is connected to an IoTGW 204 at location 106 and an IoT application 220 is connected to IoTGW 216. By way of another example, an IoT application 222 is connected to MCN 208. An IoT application may be of different types. In an embodiment, an IoT application may be one of an IoT Management Application (IoTMA) and an IoT Consumer Application (IoTCA).

IoTMA may be distributed in the IoT network and may not necessarily be centrally located. The IoTMA primarily manages function and policies of an IoT network and also provides thresholds for an ICGW. Threshold may be provided for one or more of, but not limited to packet delays, packet drops, and signal strength for a particular IoT session.

Upon receiving a communication request, the IoTMA may assess the need, reliability, security, criticality, priority, and purpose associated with the communication request, and the party/parties that may have capability to fulfill the need of the IoT network. Based on the reliability, priority, criticality, and security associated with a communication request, the IoTMA may also adapt the thresholds for an ICGW.

After assessing the communication request, the IoTMA may initiate actions to determine identity of the party for which the communication should be set up. Thereafter, the IoTMA appends the communication request with message type, priority, criticality, and dependency/correlation with other communication requests. The IoTMA keeps track of each communication request originating from and terminating at an IoT network. The IoTMA may not maintain communication sessions, however, it collects relevant information about the ongoing/completed sessions for future use. The future use, for example, may include assigning priority and criticality to future communication requests, request for secure communication mechanisms to be used. The IoTMA also provides relevant information about parameters that need to be monitored in order to perform one or more of: assess suitability of an IoTGW, raise a change trigger along with associated thresholds to the IoT network, and the actions that the IoT network should take upon receiving a change trigger.

The IoTMA provides Primary Cause Action (PCA) tables for each of IoT network, IoTGW, and ICGW to an IoTGW during registration of the IoTGW. If there are any updates to these PCA tables at a later point of time, the IoTMA provides updated PCA tables to the IoTGW. These updates may be because of policy updates, for example. The IoTMA takes actions in response to reported primary causes/events received from the IoTGW based on the IoTMA PCA table. In an exemplary embodiment, an IoTMA PCA table may be represented as:

| Primary Cause | Additional Condition(s) (if applicable) | Action(s) |
|---|---|---|
| Content adulteration on network interface between IoTGW and IoT network | Sensitive information is being shared in a communication session (determined based on session characteristics and session state) | Terminate the communication session |
| | Sensitive information has already been shared in the communication session | Continue the communication session. IoT network and/or IoTGW to enhance monitoring granularity and report any future incidents to IoTMA |
| | Sensitive information may be shared later in the communication session | Continue the communication session if an alternative and more secure connection mode can be established |
| | Communication session does not involve sharing of any sensitive information | Allow communication session to continue but request for increased frequency of exception reporting |
| Session priority/criticality NOK | | Update priority/criticality based on IoT Functional Session State (FSS) and priority/criticality of other dependent sessions. For example, increase priority/criticality, if FSS = initial info exchange, and dependent sessions have same or higher priority/criticality |

An IoT application may be an IoTCA, the IOTCA makes use of the available data from one or more IoT networks in order to provide value-added services. The association between the IoTCA and the IoT network is typically temporary in nature.

An IoT network may include multiple IoT nodes (IoT devices) joined together to form a network for a particular purpose, for example, a wireless sensor network. An IoT node denotes a node in the IoT network which could be, but not limited to a simple device such as a sensor that simply transmits sensor readings periodically or upon crossing thresholds using a single communication interface, a device which consists of a sensor and a separate processing unit for carrying out complex operations, a device which supports multiple connectivity options. At least one device in the IoT network may have connectivity to external IoT networks to enable inter-IoT communication. In other words, the IoT network has the ability to communicate outside the IoT network. The IoT devices in the IoT network that have external connectivity discover IoTGWs and determine the appropriate IoTGW amongst the discovered IoTGWs. Some of the IoT devices in the IoT network may act as relay nodes for those IoT devices, which do not have direct connectivity to other IoT devices or to the IoTGW.

The IoT network receives information from the IoTMA about parameters that need to be monitored for assessing suitability of an IoTGW and for raising a change trigger. The IoT network also receives thresholds associated with these parameters. The identity of a home IoTGW could be pre-provisioned in the IoT network, as the level of exposure of information of an IoT network to an IoTGW may depend on whether the IoTGW is its home IoTGW or not. To ascertain suitability of an IoTGW for an IoT network, IoTGW parameters may be used. The IoTGW parameters may include, but are not limited to number of IoT devices with direct connectivity to an IoTGW, IoTGW connectivity options supported taking into consideration the current energy level of the IoT network, signal strength, secure communication options supported, packet sending/reception delay determined based on Round Trip Time (RTT), and energy level of the IoTGW.

For assessing suitability of an IoTGW, IoTGW-related thresholds for the above parameters are defined. Initial values of these thresholds may be present in IoT devices in the IoT network. Adapted values may be provided by the IoTMA at a later point of time. The IoTGW parameters are either present/collected by the IoT network, or obtained from the IoTGW. The IoT network receives instructions about parameters (representing quality of IoT session) that need to be monitored for an IoT session from the IoTGW. Some of the parameters and their threshold values may be provided by the IoTMA via the IoTGW. The parameters that need to be monitored for an IoT session includes, but are not limited to the IoTGW parameters, security exception (for example, content-adulterated packets), high interference level, and packet drops.

The IoT network further sends a periodic report that includes information about the parameters and/or occurrence of an event/exception to the IoTGW. The IoT network stores the IoT network PCA table received from an IoTGW during registration of the IoT network with the IoTGW. The IoT network then uses the IoT network PCA table to determine appropriate actions to take based on the determined primary cause when an event or an exception condition occurs. In an exemplary embodiment, an IoT network PCA table may be represented as illustrated below:

| Primary Cause | Additional Condition(s) (if applicable) | Action(s) |
| --- | --- | --- |
| Change in topology/ location of an IoT network | Reported event = connectivity issue with IoTGW (for example, high packet delay, retransmissions, and temporary connection failure) | 1.) Check if current IoTGW is suitable. If not suitable, then discover suitable IoTGW and if current IoTGW is suitable, do nothing 2.) Register with suitable IoTGW with Handover (HO) indication and ICGW identity |
| | Event = IoT network internal connectivity issue | Determine alternate paths and/or modes to (re)establish connectivity with all IoT devices |
| Content adulteration | | Send content adulteration event as a report to the IoTGW together with adulterated packet information |
| Low energy level | | Change connection mode to a lower energy interface with IoTGW. |
| High interference level/signal level too low | | Change connection mode with current IoTGW, if not possible, discover suitable IoTGW and register with it to enable session to continue. |
| One of the paths to IoTGW down | | Discover a new path to IoTGW, if not possible, based on policy, raise alarm or continue communication using remaining available paths. |
| Priority/criticality of a particular session NOK | | Report event to IoTGW, which in turn, reports to the IoTMA for suitable action(s) |
| Unexpected packets received in a particular session | | Report event to IoTGW |

In a similar manner, an IoTGW (for example, IoTGW 202 and IoTGW 204) includes information about the IoT function, associated IoT network topology (member device-capabilities, device-relationships, and locations), relevant information of neighboring IoTGWs, and direct interface to associated IoT Applications. An ICGW and IoTGW may be physically co-located or be separate and connected over interfaces that may include, but are not limited to WiFi and Bluetooth. An ICGW may be associated with multiple IoTGWs (for example, ICGW 206 is communicatively coupled to IoTGW 202 and IoTGW 204), however, an IoTGW may typically associate with one ICGW at a time, with failover connectivity to another ICGW. An IoTGW may have multiple IoT networks connected to it and could either be stationary or move together with an IoT network. For example, IoTGW 204 moves along with car IoT network 102, when it moves from location 106 to location 112.

The IoTGW follows instructions of the IoTMA for setting up and maintaining communication sessions. Such instructions could be policy-based or on occurrence of exceptional events elsewhere which has an impact of the ongoing communication session with another IoT network. The IoTGW may be a home IoTGW of an IoT network and may include detailed information about the IoT network. This information may be obtained directly from the IoT network or through NWDB 210. In an embodiment, identity of the home IoTGW may be pre-provisioned in the IoT network, as the level of exposure of information of an IoT network to an IoTGW may depend on whether or not the IoTGW is the home IoTGW.

An IoTGW also determines if a current ICGW is suitable for a communication session by comparing External Communication Factors (ECF) with associated thresholds in a set of ICGW thresholds. The comparison may be performed before the start of a communication session of the IoT network or when the communication session is ongoing. ECF may include, but are not limited to network conditions (signal strength, coverage taking into account mobility as in case of cellular networks delays) for a particular communication session, delays (for example, RTT), packet errors/packet drops for a particular communication session, distance from the ICGW (when an IoTGW moves along with an IoT network), security aspects such as secure connection modes supported by both IoTGW and ICGW (and the overlap) taking into account the location, and IoT network type, connectivity options supported by the ICGW and their dynamic status, and those supported by an IoTGW due to energy constraints.

Information about the ECF may be obtained by one or more of, but not limited to following: available locally within the IoTGW (for example, packet delays, drops, signal strength, connectivity modes supported currently, historical data about duration of communication session), obtained from the ICGW (for example, connectivity modes supported currently, associated network conditions, and security capabilities), obtained/determined from a communication request (for example, the remote party information, security requirements, priority/criticality of the communication request).

Further, the thresholds associated with an ICGW may be provided by the IoTMA based on the purpose and nature of communication request, after dynamically adapting pre-provisioned inputs based on priority and criticality associated with the communication request (as explained before).

In addition to thresholds associated with the ICGW, the IoTGW also obtains the information about thresholds for monitoring network conditions, session characteristics, which include, but are not limited to threshold for number of devices which have changed location (for example, by 'x' meters in the last 'y' seconds), threshold for presence of any interfering Wi-Fi networks, threshold for QoS requirements for the specific priority and criticality. The IoTGW also obtains from the ICGW information related to thresholds that may include, but are not limited to topology changes, energy levels of devices, and acceleration of IoT network during mobility. The IoTGW receives instructions from the IoTMA and the ICGW regarding which parameters (representing quality of IoT session) need to be monitored for a particular communication session. The parameters may be standard parameters applicable for all IoT communication sessions and may include, but are not limited to ECF, change in priority, purpose, criticality, and location. Alternatively, the parameters may be specific to a particular communication session and may include, but are not limited to security exceptions. The value of all these parameters is periodically compared with associated thresholds.

The IoTGW sends relevant context information (for example, topology of IoT network, IoT functional session state, and channel state) to ICGW when connection to an IoT network is lost and the connection cannot be re-established within a pre-provisioned time interval. The IoTGW also periodically updates the ICGW of such context information based on architecture of the IoTGW and network-level policy. For example, such periodic updates may be required when IoTGW has a non-redundant architecture or when the IoT functions are critical to ensure proper session continuity and context awareness even under extreme conditions.

The IoTGW may include a table that has details regarding actions to be taken upon determining a primary cause for an event or exception that occurred during a communication session. The events/exceptions may include ICGW going down, loss of connectivity with ICGW, receiving an event trigger from IoT network or ICGW, policy updates received from the IoTMA. In an embodiment, the IoTGW may include a table that contains default actions pertaining to generic events such as unavailability of communication channel.

For each communication session, during the IoTGW registration phase, the IoTGW requests for an IoTGW PCA table and stores it locally in order to determine appropriate actions that should be taken based on the determined primary cause when an event or an exception occurs. The IoTGW additionally receives the IoT networks PCA table and the ICGW PCA table. The IoTGW provides the IoT network PCA table to the IoT network during registration of the IoT network with the IoTGW. Similarly, the IoTGW provides the ICGW PCA table to the ICGW during registration of the IoTGW with the ICGW. In an exemplary embodiment, an IoTGW PCA table may be represented as illustrated below:

| Primary Cause | Additional Condition(s) (if applicable) | Action(s) |
| --- | --- | --- |
| Change in topology/location of IoT network | Connectivity to IoT network lost, and pre-configured threshold for re-connection with IoT network elapsed | Send session context information (IoT network topology, IoT functional session state, channel state) to ICGW and clear all resources in IoTGW. |

-continued

| Primary Cause | Additional Condition(s) (if applicable) | Action(s) |
|---|---|---|
| | Connectivity to IoT network lost, but pre-configured threshold for re-connection with IoT network not elapsed | Update elapsed time and wait for elapsed time to cross pre-configured threshold. |
| IoTGW mobility | Connectivity to IoT network not lost | Send IoT network topology update information to ICGW. |
| | Re-connection with ICGW successful within pre-configured duration | Check if current ICGW is suitable. If current ICGW is not suitable, discover suitable ICGW and register with ICGW with HO indication and previous ICGW identity |
| | Re-connection with ICGW successful within pre-configured duration | Discover suitable ICGW and register with ICGW by calling with HO indication and previous ICGW identity |
| Content adulteration on network interface between IoTGW and IoT network | | Send functional session state information to the IoTMA and request for instructions. Take appropriate action(s) based on instructions provided by the IoTMA (for example, terminate session and continue session with enhanced monitoring). Such appropriate action(s) could include, for example, adapt threshold for security exception in case the IoTMA instructs to continue the session with enhanced monitoring. |
| Content adulteration on network interface between the IoTGW and the ICGW or beyond | | Report to the IoTMA and request for instructions. Take appropriate action(s) based on instructions received from IoTMA (for example, continue session on a more secure connection). Such appropriate action(s) may include, for example, send exception event to ICGW together with IoTMA instructions in case IoTMA instructs to continue the session on a more secure connection. |
| Energy level (low) | | Change connection mode to a lower energy interface with IoT network. Change connection mode to a lower energy interface with ICGW. |
| One of the interfaces to ICGW down (when IoTGW is not mobile) | | Re-establish connectivity to same ICGW over another interface. If re-establishing connection not possible, discover new ICGW and register with ICGW with HO indication and previous ICGW identity |
| Priority/criticality of a particular session NOK | | Report event to IoTMA together with functional session state. IoTMA provides instructions based on policy and IoT functional session state and other dependent sessions. |
| Unexpected packets received in a particular session | | Determine if this occurred due to spurious packets inserted on interface between IoT network and IoTGW by checking status on interface between IoTGW and ICGW. If there is an issue in interface between IoT network and IoTGW, consult IoTMA for further instructions. If there is an issue in interface between ICGW and IoTGW, inform ICGW. |

The IoTGW is further communicatively coupled to one or more IoT Network(s) in IoT system 200. For example, the IoTGW 204 is connected with IoT network 102.

Figure 3A:
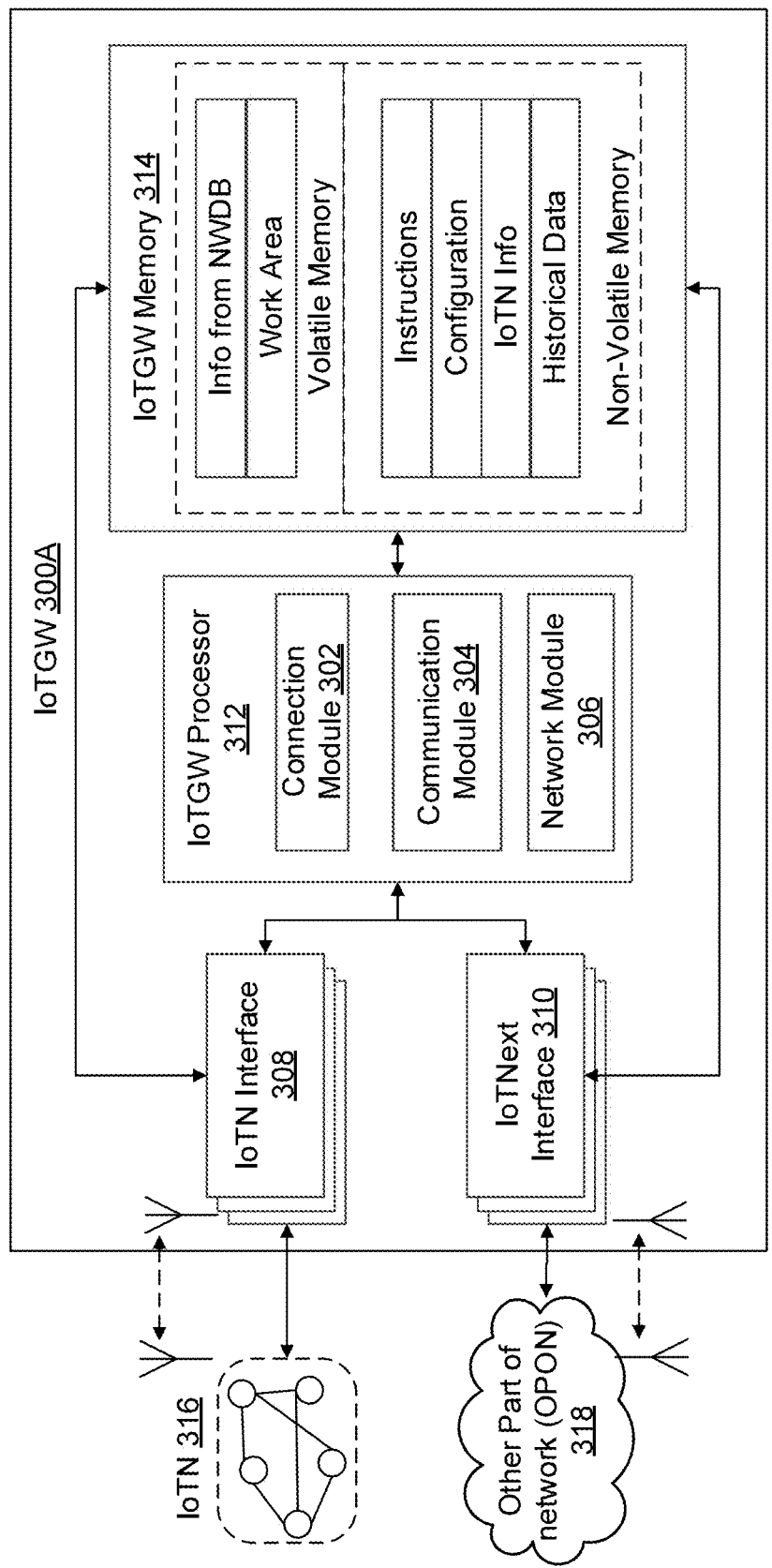
FIG. 3A is a block diagram illustrating various components and functionalities of an IoT Gateway (IoTGW), in accordance with an embodiment.

Referring now to FIG. 3A, which is a block diagram illustrating an IoTGW 300A and its components, in accordance with an embodiment. IoTGW 300A is analogous to IoTGW 204 disclosed in FIG. 2. IoTGW 300A, its various components and their functionalities are explained below in further detail. IoTGW 300A includes an IoTGW Processor 312, an IoTGW Memory 314, an IoTN interface 308, and an IoTNext Interface 310.

IoTN interface 308 enables communication with an IoTN 316. Mechanism of communication used by IoTN interface 308 may include, but is not limited to standard interfaces, such as, Bluetooth, Wi-Fi, LORA, as well as any other proprietary mechanisms. IoTNext interface 310 enables communication with other part of the network 318. Other part of the network 318 denotes the network segments in which ICGW, IoTMA, NWDB, MCN, etc. are present. Mechanism of communication used by IoTNext interface 310 may include, but is not limited to standard ones, such as, Wi-Fi, cellular (2G/3G/4G), as well as any proprietary mechanisms.

IoTGW Memory 314 includes a volatile as well as a non-volatile memory. The non-volatile memory may include, but is not limited to:

Instructions, which consists of the program instruction set for all the processor modules.

Configurations, which consists of all operational configuration parameters such as capabilities, thresholds, security settings, etc.

IoTN info which includes IoTN topology and connectivity, device details such as identity and location, authentication and authorization info, etc.

Historical data such as session durations, quality of connections, exceptions encountered, etc.

The volatile memory in IoTGW Memory 314 may include, but is not limited to information such as the following:

NWDB info consisting of IoTMA information, policy information, security information such as authentication vectors to be used, Home IoTGW details, etc.

Work area consisting of condition tables, action tables, network conditions on the connections to IoTN 316 and other part of the network 318, traffic conditions in IoTN 316 and other part of the network 318, channel information, communication information such as communication state, communication peer (remote-side entity), etc., measurements such as resources used, etc., I/O buffer, communication buffer, etc.

The volatile memory in IoTGW Memory 314 is loaded with information from the configuration, IoTN info and Historical Data sections of the non-volatile memory upon boot-up and at the start of an IoT session. Upon boot-up of IoTGW 300A, configuration parameters such as capabilities, thresholds, action tables, etc. are loaded into the Work Area section of the volatile memory from the configuration data section of the non-volatile memory. At the start of an IoT session, information such as IoTN topology, device details, etc. and session duration, exceptions encountered, etc. are loaded from the IoTN info and Historical Data sections respectively of the non-volatile memory on to the volatile memory. Relevant changes in volatile memory contents are also updated in the non-volatile memory as and when appropriate. For example, change in IoTN topology, quality of connections, etc. The contents of IoTGW Memory 314 are used by IoTGW Processor 312 during its operation.

IoTGW processor 312 includes a connection Module 302, a communication module 304, and a network module 306. In an embodiment, a single IoTGW processor 312 may host one or more out of the above mentioned three modules. In other words, there may be more than one IoTGW processor 312 in IoTGW 300A.

The functions of connection module 302 may include, but are not limited to setup, disconnect, upkeep communication channels with IoTN 316 using the IoTN interface 308 and also with other network-entities like IoTMA, and ICGW, etc., using IoTNExt-Interface 310. The functions of communication module 304 may include, but are not limited to establishing new communication, upkeep existing communication, terminate existing communication through a communication channel, determine root cause for events arising during communication and identify appropriate corrective/preventive actions using condition tables and action tables. The functions of the network module 306 may include, but are not limited to registration of network-entities like IoTMA, ICGW, etc. using IoTNExt interface 310, registration of IoTN using IoTN interface 308, discovery of available ICGWs, perform suitability condition check for ICGW, sense the conditions in IoTN 316 (reachability of IoTN nodes based on available topology, health conditions (energy level, operating status, etc.) of IoTN nodes, IoTN 316 traffic conditions (throughput, packet loss, packet error, communication delay, jitter, buffer overflow, etc.), sense the condition of other part of the network 318 using IoTNext interface 310 (reachability of other network entities like like IoTMA, ICGW, etc.), health conditions (energy level, operating status, etc.) of IoTN nodes, communication traffic conditions (channel throughput, packet loss, packet error, communication delay, jitter, buffer overflow, etc.).

IoTGW 300A (which is analogous to IoTGW 204) is further communicatively coupled to an ICGW in IoT system 200. For example, IoTGW 204 is connected with ICGW 206. Functionalities and various components of the ICGW are further explained in conjunction with FIG. 3B.

Figure 3B:
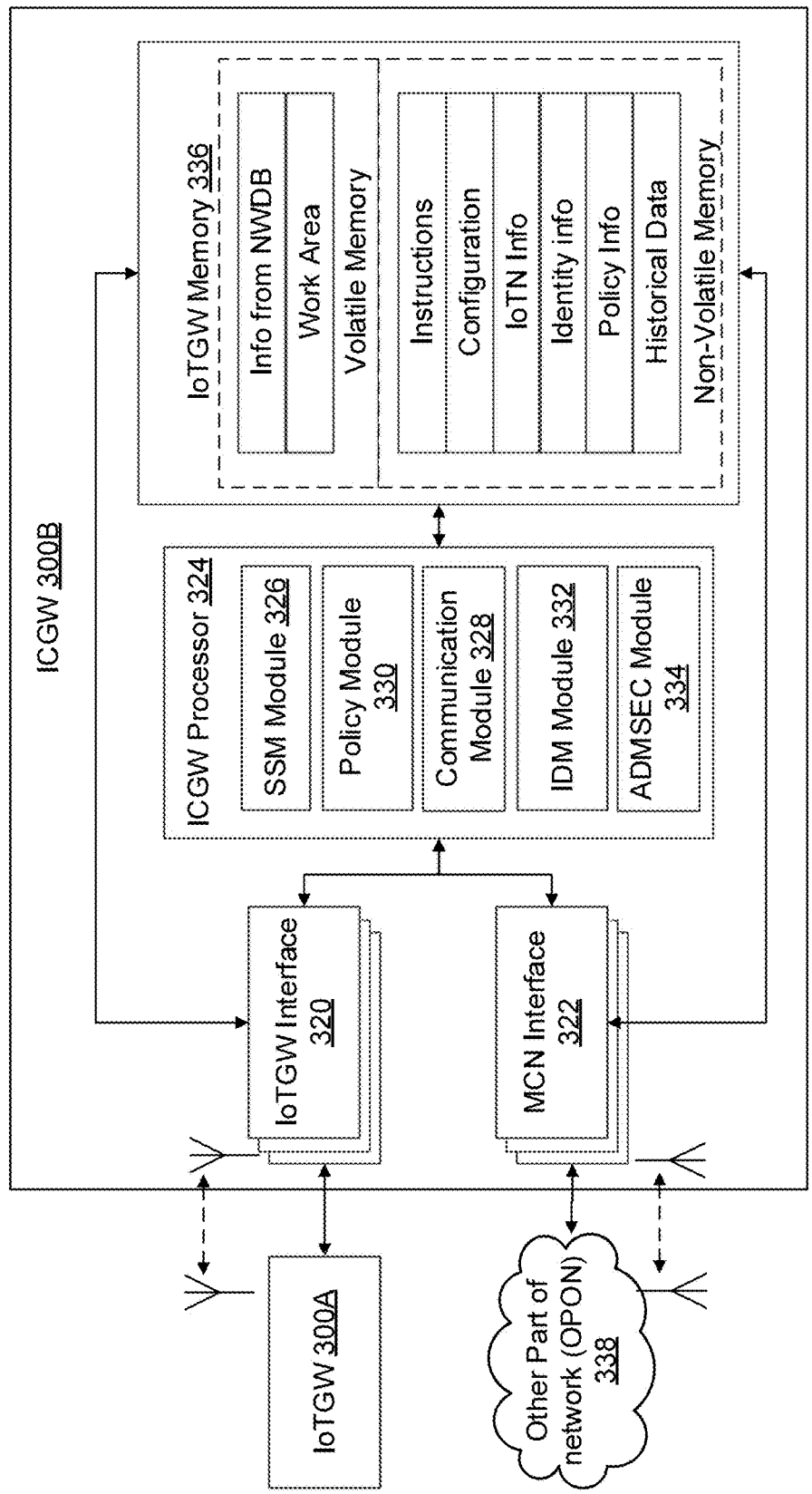
FIG. 3B is a block diagram illustrating various components and functionalities of an Inter-Connect Gateway (ICGW), in accordance with an embodiment.

Referring now to FIG. 3B, which is a block diagram illustrating an ICGW 300B, its various components and functionalities, in accordance with an embodiment. When ICGW 300B is a home ICGW, it would be located in the home network of the IoT-subscriber. In such case, ICGW 300B would include information about the policy, entitlements, and preferences of the IoT-subscriber, and any IoT-communication specific aspects. ICGW 300B includes an ICGW processor 324, an ICGW Memory 336, an IoTGW interface 320 and an MCN Interface 322.

IoTGW interface 320 enables communication of ICGW 300B with one or more associated IoTGW's (for example, IoTGW 300A). Mechanisms used by IoTGW interface 320 may include, but are not limited to standard and well-known mechanism, such as, a local IPC/MQ connectivity, connectivity over standard wireless interfaces such as Wi-Fi or BlueTooth, or some short range/line-of-sight interfaces like IR. A communication module 328 obtains the necessary information from an associated IoTGW through IoTGW interface 320 regarding the IoT network topology, status of member devices, and provides such information to other components in ICGW 300B. IoTGW interface 320 also acts as an interface to IoTGW 300A for control and signaling information exchange.

Communication module 328 monitors parameters related to network conditions towards IoTGW through IoTGW Interface 320, which further monitors parameters related to IoT network conditions towards IoTGW 300A. The parameters may include, but are not limited to packet drops, delays, packet errors, packet collisions, coverage, and congestion level on an interface to the IoTGW and availability of IoTGW interfaces. Communication module 328 sends a periodic report related to the parameters monitored through IoTGW interface 320 to a Session and Service (SSM) module 326. The periodic report may be sent when an observed parameter value crosses an associated threshold. Communication module 328 may also send a report to SSM module 326 when an exception occurs. An exception, for example, may be: when IoTGW interface 320 goes down.

MCN interface 322 enables connectivity of ICGW 300B to Other part of the network 338 that may include one or more ICGWs, IoTMAs, NWDB, Macro Cellular network (MCN) 208, etc. For example, MCN 208 may be a 3G NodeB, 4G eNodeB, or a 5G RAN node). The various modes of connectivity used by MCN interface 322 to connect to Other part of the network 338 may include, but are not limited to Wi-Fi Access Point (AP), a small cell's Home eNodeB (HeNB), a Cognitive Radio network's AP in case of opportunistic spectrum access. Communication module 328 is responsible for monitoring availability and status of heterogeneous connectivity modes (for example, 2G, 3G, 4G, 5G, WiFi, opportunistic interfaces such as Cognitive Radio) with other parts of the network 338 through MCN interface 322. Communication module 328 sends appropriate instructions to MCN interface 322, based on which, MCN interface 322 establishes a communication channel/connection with MCN 208 and/or sends/receives IoT packets to/from MCN 208. MCN interface 322 also acts as an interface to MCN 208 for control and signaling information exchange.

Communication module 328 monitors parameters related to network conditions towards MCN 208 through MCN interface 322 and sends a periodic report for the same to SSM module 326. Examples of these parameters may include, but are not limited to packet drops, delays, packet errors, packet collisions, coverage, congestion level in interface(s) to MCN 208, and availability of MCN interface 322. Communication module 328 may also send this report to SSM module 326 on occurrence of an exception, for example, when MCN interface 322 goes down.

ICGW memory 336 includes a volatile as well as a non-volatile memory. The contents of the non-volatile memory in ICGW memory 336 may include, but are not limited to
- Instructions, which consists of the program instruction set for all the processor modules.
- Configurations, which consists of all operational configuration parameters which may include but not limited to thresholds, security settings, policy, identity.
- IoTN info, which may consist of but not limited to IoTGW info, IoTN topology, Home IoTGW, connectivity, authentication and authorization info.
- Historical data, which may include but not limited to session durations, quality of connections, exceptions encountered.

The volatile memory in ICGW memory 336 may include but is not limited to information such as the following:
- NWDB info consisting of network-wide Identity Map, IoTMA information, Security info, Home IoTGW details, Reachability info, etc.
- Condition Tables, Action Tables, Network conditions (IoTGW, Other part of network), Traffic Info (IoTGW, Other part of network), Channel Info, Communication Info (communication state, communication peer (remote-side entity), measurements such as resources used, etc.), IoTGW Communication Buffer, MCN Communication Buffer, Connectivity State Info, etc.

The volatile memory in ICGW memory 336 is loaded with information from the configuration, IoTN info and Historical Data sections of the non-volatile memory in ICGW memory 336 upon boot-up and at the start of an IoT session. Upon boot-up, configuration parameters such as capabilities, thresholds, action tables, etc. are loaded into the Work Area in the volatile memory of ICGW memory 336 from the configuration data present in the non-volatile memory of ICGW memory 336. The other parts of the Work Area are updated afresh as ICGW 300B enters into operation with some entries. At the start of an IoT session, information such as IoTN topology, IoTGW info, network-wide Identity Map, etc. are loaded into the Work Area, and session duration, exceptions encountered, etc. are loaded from Historical Data. Any remaining entry in the volatile memory which are not loaded from non-volatile memory are initialized with starting values based on pre-configuration or based on info received in the session setup request. The contents of ICGW memory 336 are used by ICGW processor 324 during its operation.

ICGW processor 324 may include SSM module (session maintenance module) 326, a policy module 330, communication module 328, an ID module (IDM) 332, an Administration and Security (ADMSEC) module 334. In an embodiment, a single ICGW processor 324 may host one or more out of these five modules mentioned above. In other words, there may be more than one ICGW processor 324 in ICGW 300B.

SSM module 326 handles session maintenance at each individual IoT subscriber and IoT device level, and also controls and maintains the IoT services associated with a particular IoT subscriber. SSM module 326 also provides the necessary information to policy module 330 for appropriate framing of policies as well as to communication module 328 to aid routing of packets. Additionally, SSM module 326 maintains the communication session, and is responsible for triggering the necessary actions whenever a change is detected in an ongoing communication session, or when any external input (for example, policy) is received which might impact the ongoing communication session.

SSM module 326 receives provisioned values of relevant thresholds for monitoring the communication session. The thresholds are received for the parameters to be monitored as described below. SSM module 326 also receives provisioned inputs for events/exceptions upon occurrence of which to take appropriate corrective measures. Some of these events/exceptions may be received from the IoTMA as well as derived from network/operator policy.

SSM module 326 also triggers monitoring actions to be performed by various sub-systems and components in ICGW 300B. For example, monitoring of parameters associated with MCN 208 by communication module 328 through MCN interface 322, parameters associated with IoTGW 300A by communication module 328 through IoTGW interface 320, and parameters associated with communication, scheduling, and routing by communication module 328. SSM module 326 further provides relevant thresholds for above mentioned parameters to various sub-systems and components in ICGW 300B.

SSM module 326 monitors availability of one or more of, but not limited to resources for ICGW 300B (based on inputs collected from other sub-systems including MCN interface 322 and IoTGW interface 320) and IoT-subscriber and IoT-network entitlements. These parameters associated with SSM module 326 are then compared with associated thresholds. SSM module 326 also stores session context information (session state and formulated policy) in its local database when connectivity is lost with an IoTGW and cannot be re-established. When another ICGW sends a query to fetch session information, SSM module 326 responds with the requested details and clears the database entry. In addition, if ICGW 300B's architecture does not have adequate redundancy, then SSM module 326 also periodically updates NWDB 210 regarding one or more of, but not limited to the session state and formulated policy. This ensures proper session continuity and context-aware communication in scenarios when ICGW 300B goes down.

SSM module 326 stores the ICGW PCA table received from IoTGW 300A during registration of IoTGW 300A with ICGW 300B. The ICGW PCA table is then used to determine appropriate actions that need to be taken based on the determined primary cause when an event or an exception condition occurs. In an exemplary embodiment, an ICGW PCA table is illustrated in the table below.

| Primary Cause | Additional Condition(s) (if applicable) | Action(s) |
|---|---|---|
| Issue with specific interface (e.g., Wi-Fi) with MCN 208 | | (a) For any critical communication (defined by criticality, priority, policy), move ongoing communication to another available and suitable MCN interface (with the help of communication module 328 and MCN interface 322). (b) Re-establish the connection over the lost interface to MCN 208 up to a pre-provisioned interval. If re-connection is not successful, then move all remaining ongoing sessions via that faulty MCN interface to another suitable interface to MCN 208 |
| IoTGW mobility | Reported event = connectivity to IoTGW lost, and pre-configured threshold for re-connection with IoTGW elapsed | Store session context information (session state, formulated policy, etc.) in local database and clear all resources in ICGW 300B. |
| | Reported event = connectivity to IoTGW lost, but pre-configured threshold for re-connection with IoTGW not elapsed | Update elapsed time and wait for elapsed time to cross pre-configured threshold. |
| Content adulteration interface between IoTGW and ICGW | Instruction from IoTMA (received via IoTGW) = continue session using a more secure communication mode | Change connection mode with IoTGW for the session (e.g., use IPsec, change interface, etc.) |
| | Instruction from IoTMA (received via IoTGW) = Continue session with enhanced monitoring | Update security exception thresholds and continue session |
| | Instruction from IoTMA (received via IoTGW) = Terminate session | Inform IoTGW and MCN 208 to terminate the session, and also clean up all the session's resources within the ICGW |
| IoT subscriber entitlement | Reported event = Quality of Service (QoS) related issue with ongoing session | (a) Use a suitable alternative mechanism (for example, use non-GBR LTE bearer) or interface (for example, WiFi) to MCN 208 that would come closer to meeting QoS criteria (b) Send an alarm (via IoTGW) to IoTMA to inform the IoT subscriber of QoS drop due to insufficient entitlement |
| MCN 208 node down | | Try establishing connection to another MCN node, if not possible, terminate all IoT sessions, inform IoTGW and IoTMA (via IoTGW). |
| Priority/criticality of a particular session NOK | | Request IoTGW to report event to IoTMA. |
| Content adulteration on ICGW interface to MCN 208 or beyond | | Check Communication Policy (CP). If CP indicates choose a secure mode, switch to a secure connection mode for this session (and proactively for similar sessions). |

Policy module 330 is responsible for formulating, maintaining and updating the communication policy based on IoT device capabilities, roles and responsibilities of IoT devices, their relationships, IoT function, IoT network topology, provisioned information (MCN 208 entitlements and IoT network level entitlements), and security requirements. Policy module 330 interacts with MCN 208 to obtain relevant inputs such as subscriber entitlement for formulating the communication policy. Policy module 330 obtains the IoT devices and IoT network-specific inputs from the IoTGW via the IoT gateway interface and obtains relevant inputs from ADMSEC module 334 as well as NWDB 210 for formulating the policy. Policy module 330 provides the formulated communication policy to communication module 328 for appropriate scheduling and routing of the packets.

Thereafter, based on the communication policy, specific communication need (request), the communication source and destination, current status of IoT subscriber entitlement, and network conditions in MCN 208, and interfaces to MCN 208, communication module 328 performs scheduling of the communication on the appropriate communication interface at the appropriate instant of time. Communication module 328 is also responsible for routing of packets over the appropriate interface to enable them to reach the destination and also monitors parameters related to communication, scheduling and routing (related to quality of IoT session). These parameters may include, but are not limited to local queue full, security exceptions, and unavailability of end-to-end routes. Communication module 328 sends a periodic report of the same to SSM module 326. Alternatively, the report may be sent to SSM module 326, when an exception occurs. For example, when a critical security exception occurs.

IDM 332 handles unique ID assignment to IoT devices, with the help of network-wide database(s). Since the ID of an IoT device has to facilitate the communication and reachability of a device from anywhere, the assignment of ID to a device takes into consideration the subscriber identification, the home IoTGW, and the device itself. A permanent ID for the IoT network as well as the devices are assigned, and a temporary/routing ID is assigned to enable routing of packets to/from the IoT network during mobility.

ADMSEC module 334 handles all administration, configuration and security related aspects. It has an operator interface through which it can obtain provisioning inputs for formulating one or more of, but not limited to communication policy (for example, QoS, service category, subscription details), security aspects (for example, authorization, authentication, and encryption), and subscriber entitlement and allowances. ADMSEC module 334 is also responsible for implementing the appropriate security mechanisms (for example, encryption of data sent to MCN 208) and also instructing the IoT gateway regarding security aspects. ADMSEC module 334 interacts with NWDB 210 to obtain relevant inputs for security and also provides relevant information to communication module 328 for framing the communication policies.

Figure 4A:
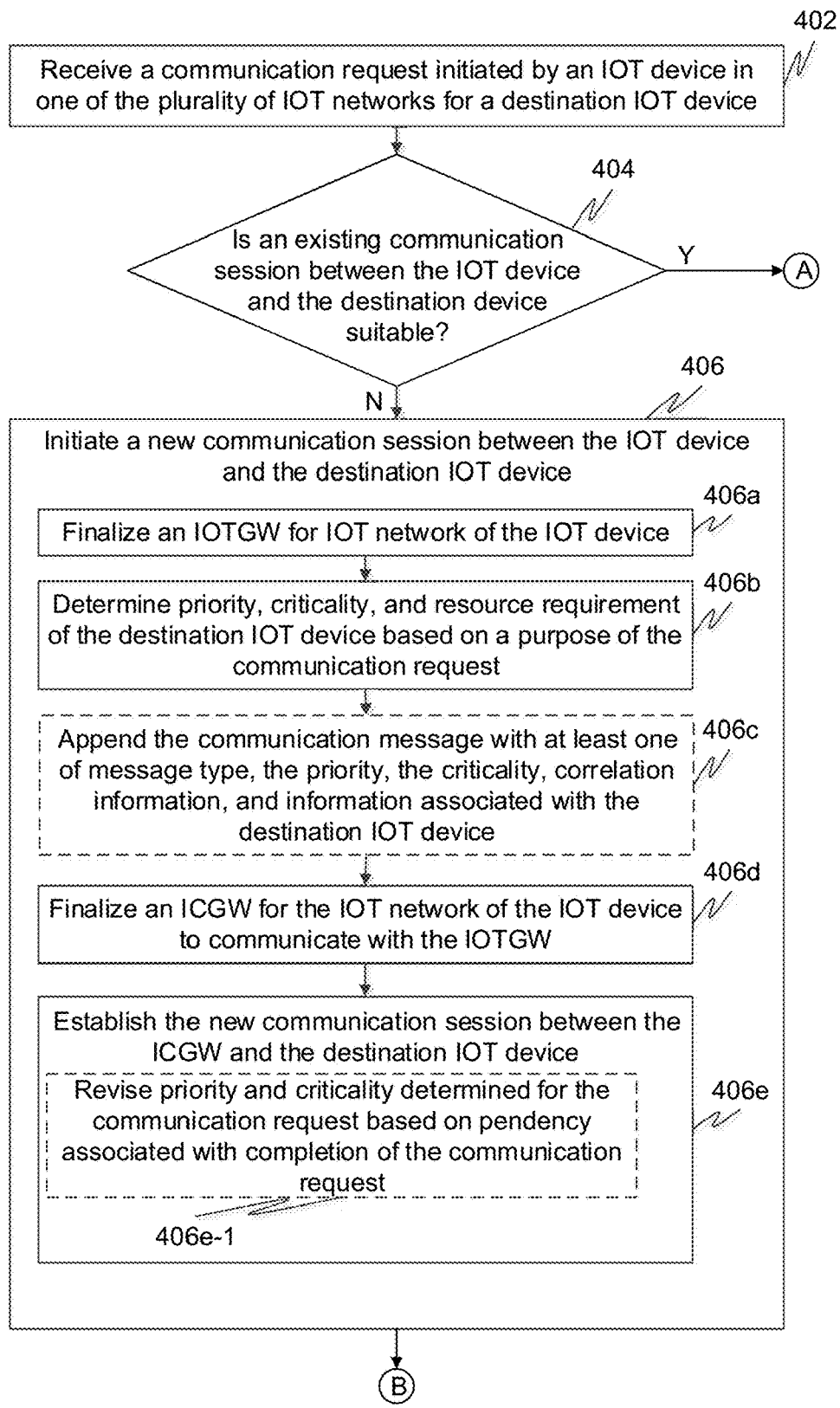
FIGS. 4A and 4B illustrates a flow chart of a method for managing communication across a plurality of IoT networks, in accordance with an embodiment.
Figure 4B:
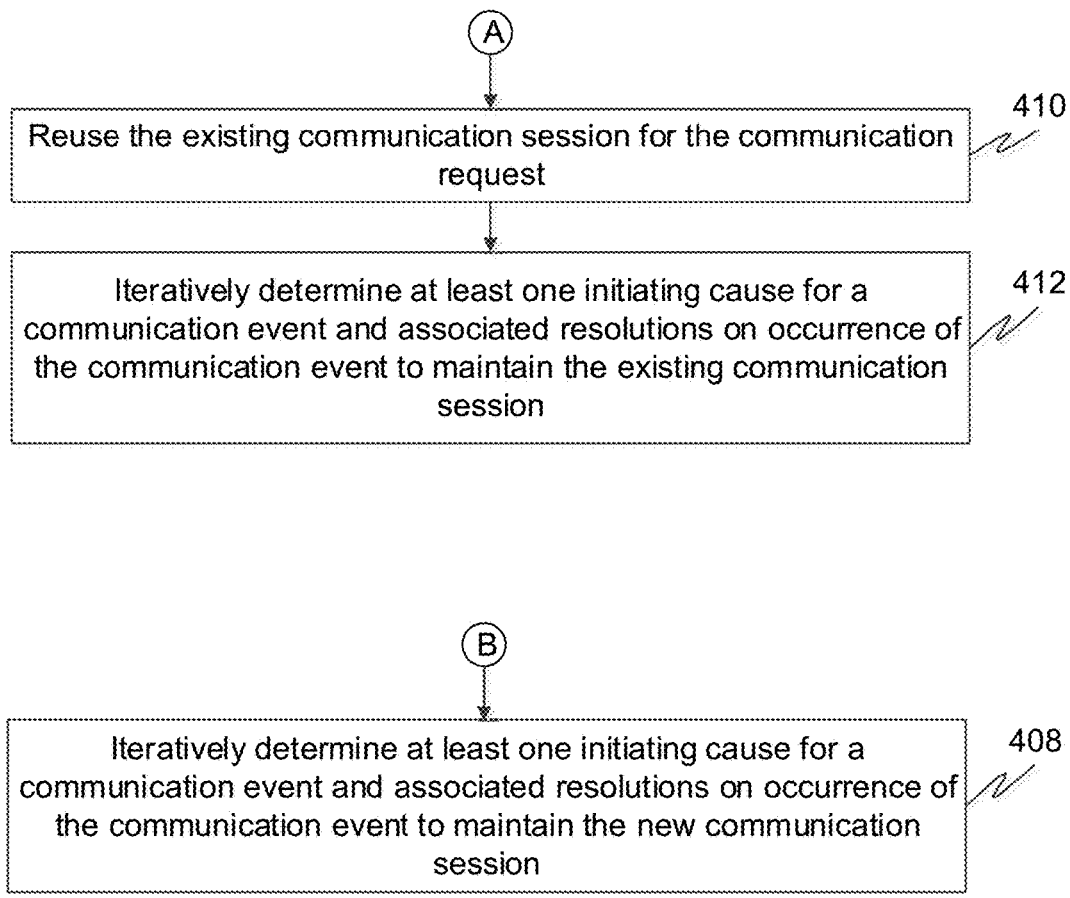

Referring now to FIGS. 4A and 4B, illustrates a flowchart of a method for managing communication across a plurality of IoT networks, in accordance with an embodiment. At 402, a communication request initiated by an IoT device in one of the plurality of IoT networks for a destination IoT device is received. For example, at location 112, an IoT device (originating IoT device) in car IoT network 102 may initiate a communication request for an IoT device (destination IoT device) in gas station IoT network 114. The IoT network of the IoT device may determine that the communication request is for external communication.

In this case, the IoT network performs a check to determine if a communication session exists between the IoT device and the destination IoT device. This is further explained in conjunction with FIG. 9. In other words, it is checked whether there is an ongoing communication session between the IoT device and the destination IoT device. In an embodiment, other than being initiated for a specific IoT device in an external IoT network, the communication request may be initiated for the external IoTN, or an IoT consumer application.

When it is determined that a communication session does not exist, a new communication session is initiated between the IoT device and the destination IoT device. This is further explained in detail below. However, when it is determined that there is an existing communication session between the IoT device and the destination IoT device, a check is performed at 404 to determine if the existing communication session is suitable. If it is determined at 404 that the existing communication session is not suitable, a new communication session is initiated between the IoT device and the destination IoT device at 406.

Initiating the new communication session further includes finalizing an IoTGW for IoT network of the IoT device at 404a. The IoTGW is finalized based on comparison of a set of IoTGW parameters with associated thresholds within a set of IoTGW thresholds in response to receiving the communication request. The IoTGW parameters have been explained in detail in conjunction with FIG. 2. In an embodiment, to finalize the IoTGW, a current IoTGW that is connected with the IoT network is selected, when the set of IoTGW parameters for the current IoTGW satisfy associated thresholds. Thereafter, if the IoT network is not registered with the current IoTGW, the IoT network of the IoT device is registered with the current IoTGW. For example, for a particular communication request initiated from an IoT device in car IoT network 102, IoTGW parameters for the current IoTGW, i.e., IoTGW 204, may satisfy the associated thresholds. In this case, IoTGW 204 is finalized for routing the communication request. This is further explained in detail in conjunction with FIG. 5.

Alternatively, when the set of gateway parameters for the current IoTGW fail to satisfy associated thresholds, suitability scores are assigned to each of the plurality of IoTGW's. The suitability scores are assigned based on comparison of the set of IoT gateway parameters with associated thresholds for each of the plurality of IoTGW's. In other words, an IoTGW in IoT system 200 may be assigned a suitability score based on result of a comparison of its IoTGW parameters with associated thresholds. This is repeated for every IoTGW in IoT system 200 and as a result, every IoTGW gets a suitability score assigned. Thereafter, an IoTGW that has the highest suitability score is finalized as the IoTGW to be used for routing the communication request initiated by the IoT device. The IoT network of the IoT device is then registered with this IoTGW that has the highest suitability score. This is further explained in detail in conjunction with FIG. 6.

In an exemplary embodiment, an IoTGW may be finalized by performing the following steps:

---

The IoT network determines if there is an IoTGW connected with the IoT network.
    If no IoTGW is connected to the IoT network,
    Then,
        The IoT network discovers and determines a suitable IoTGW by comparing pre-provisioned IoTGW parameters with the associated thresholds.
        The IoT network registers with the suitable IoTGW, and if registration fails, it registers with the next suitable IoTGW. This process is iteratively repeated until a successful registration.
    Else
        The IoT network checks if the current IoTGW is suitable using the IoTGW parameters to check and the associated thresholds that were -continued

```
            provided by the IoTMA during IoT network registration when the IoT
            network registered with the current IoTGW earlier.
    If the current IoTGW is not suitable
    Then
            The IoT network discovers and determines a suitable IoTGW
            The IoT network registers with the suitable IoTGW, and if
registration fails, it registers with the next suitable IoTGW. This process is iteratively
repeated until a successful registration. After successful registration, the suitable
IoTGW becomes the current CIoTGW.
    Else
        The IoT network checks registration status with the current IoTGW.
        If IoT network is already registered with the current IoTGW
        Then
            The IoT network sends information about its current location,
            topology, etc., and if re-registration is requested by the IoTGW
            due to change in context, the IoT network performs
            registration.
    Else
        The IoT network registers with the current IoTGW. If the
        registration fails, then the IoT network performs the actions as
        described above for the case of current IoTGW not being
        suitable (i.e., IoTGW discovery, determination of suitable
        IoTGW, registration with IoTGW).
            Fi
        Fi
    Fi
The IoTN sends the communication request to the current IoTGW (finalized
as the IoTGW), which, in turn, forwards the communication request to the
IoTMA. This exemplary embodiment is further explained in conjunction with
exemplary embodiments given in FIG. 5 and 6.
```

After finalizing the IoTGW, priority, criticality, and resource requirement of the destination IoT device is determined for the communication request at 406b. These may be determined based on a purpose of the communication request. In an exemplary embodiment, the purpose may be determined by the IoTMA, which checks the message type from the communication request and refers to its internal message catalogue.

Thereafter, the IoTMA assigns a purpose value to the communication request.

To determine priority for the communication request, an internal mapping table may be searched to determine mapping of the purpose with the priority. Additionally, existence of a preceding communication request between the IoT device and the destination IoT device is determined. The communication request may have dependency with purpose and state of the preceding communication request. In an exemplary embodiment, to determine priority for the communication request, the IoTMA checks the purpose and assigns corresponding priority mapping based on its internal catalogue. Thereafter, the IoTMA checks the status of any preceding communication session(s)/request(s) upon which the current communication request may be dependent. Based on this check, the IoTMA adapts the priority of the current communication request to match the priority of the earlier communication request. The IoTMA prepares an indication to be included in the communication request about the dependency/correlation between this communication request and the preceding communication session(s)/request(s) upon which this communication request may be dependent.

Further, the criticality of the communication request is determined based on one or more of the purpose of the communication request, type of the communication request, function of the IoT device, time of initiation of the communication request, age of the communication request, and the destination IoT device.

In an exemplary embodiment, the IoTMA may use the following table to determine criticality:

| Purpose | Device type & function | Time at which request was raised | Criticality (listed in descending order) |
|---|---|---|---|
| X1 | D1 | >1 minute | C1 |
| X1 | D1 | >30 seconds, <1 minute | C2 |
| X1 | D2 | >2 minutes | C3 |
| ... | | | |
| X5 | D7 | >5 minutes | C2 |

Based on the purpose, the IoTMA may also determine aspects such as resource requirements (for example, bandwidth requirements) for the communication request from its internal catalogue.

The communication request may be appended, at 406c, with information that may include one or more of message type, the priority, the criticality, correlation information, and information associated with the destination IoT device.

Thereafter, the IoTMA determines the specific party to which the communication session should be setup is determined. The chosen appropriate party for communication is then marked as the identified party by the IoTMA. In an exemplary embodiment, the IoTMA may determine the identified party by examining content of the communication request. This may include discovery of one or more potential parties, and then selecting the appropriate party to communicate with from the discovered parties. For example, if the communication request from car IoT network 102 was for performing a non-critical service, the IoTMA then initiates a discovery of suitable service stations. Such a discovery may be performed by the IoTMA associated with car IoT network 102 using one or more of the following methods:

a. IoTMA may send a multicast/broadcast request to service stations in the vicinity of Car IoT network 102. The request may also include the service requirements that are mandated by the network policy and/or user inputs (for example, secure communication involving mutual authentication, and cashless payment) to which the responding service station IoT networks should comply.

b. The IoTMA associated with car IoT network 102 sends a request to an IoTMA that manages service station IoT networks to learn identity of service stations in the vicinity of car-IoT network 102 (the identity of such an IoTMA could be obtained from NWDB 210). Subsequently, the IoTMA of car-IoT network 102 sends a request to the service stations to ascertain their suitability to meet the requirements that are mandated by the network policy and/or user inputs (for example, secure communication involving mutual authentication, and cashless payment).

c. Based on the response from the service station IoT networks (via their respective IoTGW and ICGW), the IoTMA determines the appropriate party based on their anticipated distance from the service station in a pre-provisioned time (for example, two minutes). By way of an example, based on speed of mobility and direction of movement of car IoT network 102, the anticipated distance from the service station in a pre-provisioned time (e.g., 2 minutes). Further, taking criticality into account, the parties (different service stations) may be ranked as depicted in the following table, where rank 1 is most suitable, rank 2 is next most suitable, and lowest rank is given to the least suitable service station. The service station with the highest rank may be chosen based on historical data on the success rate of fulfilling communication requests:

| Service Station Id | Anticipated distance | Criticality (descending order) | Rank |
|---|---|---|---|
| 1 | 25 km | C1 | 1 |
| 1 | 25 km | C2 | 1 |
| 2 | 30 km | C1 | 2 |
| 2 | 30 km | C2 | 1 |
| ... | ... | ... | ... |
| 6 | 50 km | C2 | 9 |

At 406d, an ICGW is finalized for the IoT network of the IoT device to communicate with the IoTGW based on comparison of a set of communication parameters with associated thresholds within a set of ICGW thresholds. The communication parameters and the associated thresholds have been described in detail in conjunction with FIG. 2. In an embodiment, a current ICGW is finalized when the set of communication factors for the current ICGW satisfy associated thresholds. Thereafter, the IoTGW finalized at 406a and the IoT network of the IoT device are registered with the current ICGW in absence of such registration.

However, when the set of communication factors for a current ICGW fail to satisfy associated thresholds, suitability scores are assigned to each of a plurality of ICGW's. The suitability scores are assigned based on comparison of the set of communication factors with associated thresholds for each of a plurality of ICGW's. Thereafter, an ICGW that has the highest suitability score amongst the plurality of ICGW's is selected. The IoTGW and the IoT network of the IoT device are then registered with the ICGW.

In an exemplary embodiment, an ICGW may be finalized by performing the following steps:

a. The IoTMA provides appended communication request that includes message type, priority, criticality, dependency, and correlation information, identified party, resource requirements, etc. together with the adapted thresholds for ICGW to the current IoTGW, and triggers the current IoTGW to determine a suitable ICGW and register with the ICGW (when the current IoTGW is not already registered).

b. The current IoTGW first checks if it is connected with an ICGW by checking registration status, heartbeat, acknowledgements to probe packets, and beacon signals. Based on the check performed, two scenarios exist:

i. The current IoTGW checks if it is connected with an ICGW, if yes:
      The current IoTGW checks if a current ICGW is suitable.
         If the ICGW is not suitable, the current IoTGW initiates discover of ICGW to determine a suitable ICGW.
   ii. Else: (Find a suitable ICGW)
      The current IoTGW executes discovery of ICGW and determination of a suitable ICGW.

c. The current IoTGW then checks with the suitable ICGW, the registration status of the IoT network and the current IoTGW.

i. If IoT network and the current IoTGW are registered in the past with the current ICGW
      The current IoTGW and the IoT network performs a detailed registration with the ICGW, if there is a change in IoT network context since the last registration, for example, change in location, topology, and policy.
      If there is no change in IoT network context, then the current IoTGW only sends a status update (for example, power level and connectivity status) to the current ICGW.
   ii. If the current IoTGW was registered but the IoT network is never registered with the current ICGW:
      The current IoTGW performs the registration of the IoT network and also updates the current ICGW of the current IoTGW location, connectivity modes supported and other relevant information.
   iii. Else (the current IoTGW and the IoT network are never registered), perform Detailed Registration with suitable ICGW:
      In this case, the IoTGW performs a detailed registration with the suitable ICGW.

d. After successful registration with the suitable ICGW, the current IoTGW marks the suitable ICGW as the Current ICGW. If the registration fails, the current IoTGW then selects the ICGW with the next highest suitability score as determined above, and proceeds with the registration.

This process is iteratively repeated until completion of successful registration, and the current IoTGW informs the IoTMA. This exemplary embodiment is further explained in conjunction with exemplary embodiments given in FIGS. 7 and 8.

Thereafter, at 406e, the new communication session is established between the ICGW and the destination IoT device, based on the priority and the criticality determined for the communication request. The communication channel between the IoT device and the destination IoT device is routed through one or more of the IoT network of the IoT device, the IoTGW, the ICGW, the IoT network of the destination IoT device, an ICGW associated with the destination IoT device, and an IoTGW associated with the destination IoT device. This further includes, revising priority and criticality determined for the communication request, at 406e-1, based on pendency associated with completion of the communication request.

In an exemplary embodiment, the new communication session may be established by executing the following steps:
  a. The IoTGW checks relevant communication policy to assess allowance of the communication request, and if allowed, it first revises the criticality in the message type, priority, and criticality of the communication request based on the duration for which the communication request was pending with the IoTGW (for example, delays introduced due to repeated ICGW registration).
  b. The IoTGW then sends a communication channel request that includes updated communication request with the message type, priority, criticality, dependency, and correlation information, identified party (the destination IoT device), and resource requirements, to SSM module 308 for setting up a communication channel with the identified party.
  c. SSM module 326 then checks the relevant communication policy to assess allowance of such communication request and forwards the communication channel request to communication module 328.
  d. Communication module 326 adapts the communication request criticality and priority, for example, as follows:
   Revised communication request criticality=
    =Maximum {Highest criticality level, communication request priority upgraded by 1 level}, if the request was pending for >1 min and <=2 minutes
    =Maximum {Highest criticality level, communication request priority upgraded by 2 levels}, if the request was pending for >2 minutes.
    =communication request priority, otherwise
   Revised communication request priority=
    =Dependency and correlation priority, if status for the same is pending
    =communication request priority, otherwise
  e. Communication module 328 determines appropriate mode of communication as follows:

```
If IoT-subscriber and IoT-entitlement is allowed
Then
   If critical communication L1 request
   Then
      Initiate allocation of suitable bearer (GBR bearer if Priority = P1,
      P2, else non-GBR bearer) with indication to preempt any ongoing
      communication if no resources available on the most stable
      communication channel (obtained from historical data)
   Else if critical communication L2 request
   Then
      Initiate allocation of suitable bearer (GBR bearer if Priority = P1,
      P2, else non-GBR bearer) on the most stable/2nd most stable
      communication channel (obtained from historical data)
   Else if priority communication P1/P2 request
   Then
      Initiate allocation of suitable GBR bearer, if not available, initiate
      allocation of next lower GBR bearer till GBR bearer available. If
      no GBR bearer can be allocated, request for a low GBR bearer
      preempting ongoing communication
   Else
      Forward request if a non-GBR bearer is existing, else initiate
      allocation of a non-GBR bearer.
      If allocation of non-GBR bearer fails
      Then
         If secure and/or reliable communication is requested
         Then
            Send appropriate feedback to the IoT network, and also
            inform the IoTMA.
         Else
            Use Wi-Fi if available, if not, select a suitable and
            available communication mode (for example,
            Bluetooth)
         Fi
      Else
         Proceed further with the allocated non-GBR bearer.
      Fi
   Fi
Else
   Send appropriate feedback to the IoT network, and also inform the IoTMA.
Fi
```

As a result of the above processing, some existing communication sessions may have to be moved to another interface. This, in turn, may involve setting up of new communication channels or increasing the resources on an existing communication channel. All these actions are handled by communication module 328, and SSM module 326 is informed by communication module 328 after the interface change is completed successfully.
  f. SSM module 326 and communication module 328 then set up the communication channel upon receiving acknowledgement from MCN 208 via MCN interface 322
  g. Communication module 328 then checks the reachability of the identified party via the communication channel. If the identified party is not reachable via the established communication channel, communication module 328 attempts the setup of an alternate path to the identified party using the logic described above.
  h. If a communication channel cannot be established with the identified party directly via MCN 208, communication module 328 interacts with peer-ICGWs to determine a suitable communication path to the identified party that fulfills the QoS and the message type, priority, and criticality requirements of the communication request.
  i. Communication module 328 then provides communication channel details to SSM module 326 and to the IoTGW (via IoTGW interface 320). SSM module 326 then updates session status and allocates resources for the content exchange between the IoT network and the identified party.
  j. At any stage if the allocation of resource fails and there is no alternative communication mechanism via peer-ICGWs also

```
Then
If communication request is not P1/P2 priority
Then
    Communication module 328 defers the communication request until
    availability of resources or until expiry of timer
    Communication module 328 informs SSM module 326 which, in turn,
    informs the IoTGW and the IoTMA.
Else
    Communication module 328 rejects the communication request,
    informs SSM module 326 to clear all local resources.
    SSM module 326 clears resources, and informs the IoTGW and the
    IoTMA.
Fi
```

Thereafter, monitoring of parameters (representing quality of IoT session) associated with the IoT network, the IoTGW, and the ICGW is initiated. The IoTGW triggers the IoTN to start monitoring parameters associated with the IoT network. Further, the IoTGW starts monitoring parameters associate with the IoTGW. SSM module 326 initiates monitoring of relevant parameters associated with the ICGW by triggering various modules described in FIG. 3B including itself.

At 408, iteratively determine one or more initiating causes for a communication event and associated resolutions on occurrence of the communication event to maintain the new communication session. An initiating cause includes one or more of, but is not limited to change in topology in an IoT network, change of location of an IoT network, interference, high traffic, weather condition, obstacles, low energy levels at an IoTGW, receipt of an unexpected packet, content adulteration, Man-in-the-middle (MITM) attack, priority or criticality NOK, poor signal strength, mobility of IoTGW, issues associated with MCN 208, issues associated with MCN interface 322, and IoT network subscriber entitlement. The one or more initiating causes are iteratively determined amongst the IoT network of the IoT device, the IoTGW, and the ICGW.

A communication event may include one or more of, but is not limited to unavailability of an IoTGW interface, absence of an acknowledgment for a critical communication, unavailability of an IoT network, unavailability of an ICGW, resource unavailability, hardware/software fault in an IoTGW, power lapse in an IoTGW.

In an exemplary embodiment, events may be detected in following ways:
  a. If IoT network wakes up:
    Either catch an event or detect an event (exception) condition. The IoT network wakes up periodically to perform status check, or when an event (exception) condition occurs. The outcome of both cases is an 'event' which has to be analyzed. Example of a periodic status check includes IoTGW connection health-check to assess, for example, if packet delays, packet drops are within thresholds. Examples of an event include, but are not limited to IoTGW interface going down and a critical communication not being acknowledged until expiry of a timer.
  b. If IoTGW wakes up:
    Either catch an event or detect an event (exception) condition
    The IoT network wakes up periodically to perform status check of all active sessions in the IoTGW, or when an event (exception) condition occurs. The outcome of both cases is an 'event' which has to be analyzed. Example of a periodic status check includes, but is not limited to speed of movement and/or current distance of IoT network, while example of an event related to a particular session is connectivity to IoT network going down (no ACK within timer expiry and packet transmission unsuccessful), while a general abnormal condition may include, but is not limited to issues with connectivity to ICGW, resource unavailability or Hardware/Software (HW/SW) faults in IoTGW, and IoTGW running out of power.
  c. If ICGW wakes up:
    Either catch an event or detect an event (exception) condition.
    The IoT network wakes up periodically to perform status check, or when an event (exception) condition occurs. The outcome of both cases is an 'event' which has to be analyzed. Example of a periodic status check includes, but is not limited to health check of connectivity to MCN 208, while example of an event includes, but is not limited to loss of connectivity with IoTGW.

In an exemplary embodiment, an even analysis may be performed as illustrated in the following scenarios.
  a. If IoT network is receiver, then the IoT network performs event-analysis as illustrated below:
    i. If connectivity related event (determined by checkinh event_type)

```
Then
IoT network fetches monitored values of parameters for an IoT
session in the IoT network, and does a comparison of the
values against the associated thresholds, such as illustrated
below.
If average packet delay > packet_delay_threshold in
IoTGWRT
Then
    If change in location/topology of IoT network
    Then
            Primary-cause = Change in
        topology/location of IoT network
    Fi
    If interference > interference threshold
    Then
            Primary-cause = interference level
    Fi
    If signal level < minimum signal level
    Then
            If energy level < energy threshold
            Then
                Primary cause = (Low) Energy level
            Else
                Primary cause = weather conditions
                and/or obstacles
            Fi
    Fi
Fi
```

```
If packet retransmissions > retransmission_threshold
Then
    If nbr_packets_retransmitted due to timeout/corrupt
    packets > threshold
    Then
        If change in location/topology of IoT network
        Then
            Primary cause = Change in
            topology/location of IoT network
        Fi
        Etc.
    Else
        Etc.
    Fi
Fi
Etc.
Fi
```

Other connectivity related events may include loss of connectivity with IoTGW, IoT network energy falling below energy threshold, and thresholds crossed for other connectivity related IoTGW parameters.

ii. If session related event

```
Then
    If security exception
    Then
        If content adulterated packet received or spurious
        packet received
        Then
            Primary cause = content adulteration
        Else if unexpected packet(s) received
        Then
            Primary cause = Potential Man-in-the-Middle
            (MITM) attack
        Fi
    Fi
```

IoT network fetches the monitored values of parameters for an IoT session in the IoT network, and compares them with associated thresholds, as illustrated below:

```
If delay of packets of the session to/from IoTGW > packet
delay threshold
Then
    If no connectivity event reported AND no issues with
    connectivity
    Then
        Primary cause = priority/criticality NOK
    Else
        Primary cause = connectivity issue as
        determined by connectivity event analysis
    Fi
    Etc.
Fi
Etc.
Fi
```

Other session-related events may include, but are not limited to acknowledgement or response for packets sent in a particular session, and communicating partner becoming unavailable or unreachable.

b. If IoTGW is receiver, then the IoTGW performs primary cause analysis as illustrated below:

The IoTGW fetches the monitored values of IoTGW parameters and associated thresholds provided by the IoTMA. These are then used as illustrated below to aid in determination of the primary cause:

i. If connectivity related event (determined by checking event_type)

```
Then
    If connectivity to IoT network lost
    Then
        If no network related issues on IoT network
        interface AND IoTGW is not mobile
        Then
            Primary cause = Change in
            topology/location of IoT network
        Fi
        Etc
    Fi
    If connectivity to ICGW lost
    Then
        If no network related issues on IoTGW interface
        AND IoTGW is mobile
        Then
            Primary cause = IoTGW mobility
        Fi
        Else if observed value of signal strength (ECF
        value) < signal strength threshold
        Then
            Primary cause = poor signal strength
        Fi
    Fi
    Etc.
Fi
``` ii. If session-related event (determined by checking event_type)

```
Then
    If content adulteration event reported by IoT network
    Then
        If security exception detected locally due to
        reception of content adulterated packet or
        unexpected packet (spurious content)
        Then
            Primary cause = content adulteration on
            IoTGW <-> ICGW interface or beyond
        Else if Content adulteration event reported by
        IoT network
        Then
            Primary cause = content adulteration on
            IoTGW <-> IoT network interface
        Fi
    Else if delay of packets of the session to/from ICGW >
    packet delay threshold
    Then
        If no connectivity event related to ICGW
        reported AND no issues with ICGW
        connectivity
        Then
            Primary cause = priority/criticality NOK
        Fi
    Fi
    Etc.
Fi
``` iii. If any report received from IoT network (as IoT network could not handle the event)

```
If event reported by IoT network = Priority/criticality of a
particular session NOK
Then
    Primary cause = Priority/criticality NOK for the session
Else if event reported by IoT network = ...
    ...
Else
    ...
Fi
``` c. If ICGW is receiver, SSM module 326 performs primary cause analysis as illustrated below:
  i. If connectivity related event (determined by checking event_type)

```
Then
    If connectivity to MCN 208 over a particular interface
    (for example, Wi-Fi) alone is lost
    Then
        Primary cause = Issue with specific interface
            (for example, Wi-Fi) with MCN 208
    Else if connectivity to MCN over all interfaces lost
    Then
        Primary cause = Issue with MCN 208 (for
            example, node down)
    Fi
    If connectivity to IoTGW lost
    Then
        If no network related issues on IoTGW interface
        AND IoTGW is mobile
        Then
            Primary cause = IoTGW mobility
        Else
            Check network issues on IoTGW
            interface to determine primary cause
        Fi
    Fi
    Etc.
Fi
``` ii. If session-related event (determined by checking event_type)

```
            Then
                If content adulteration event reported by IoTGW
                AND if local security exception due to reception of
                content adulterated packet ((or spurious packet)
                    Then
                        Primary cause = content adulteration on
                        ICGW <-> MCN interface 304 or
                        beyond
                Else if content adulteration event reported by IoTGW
                (for example, no content adulterated packet or spurious
                packet received by ICGW)
                Then
                        Primary cause = content adulteration on IoTGW
                        <-> ICGW interface
                Fi
                If delay of packets of the session to/from ICGW >
                packet delay threshold
                Then
                        If IoT_subscriber_entitlement > entitlement
threshold
                        Then
                                Primary cause = IoT subscriber
entitlement
                        Fi
                Fi
                Etc.
            Fi
``` iii. If any report received from IoTGW (as IoTGW could not handle the event)

```
Then
    If event reported by IoTGW = content-adulteration or
    unexpected packets
    Then
        Primary cause = content adulteration on IoTGW
        <-> ICGW interface
    Else if event reported by IoT network = ...
        ...
    Else
        ...
    Fi
``` d. If IoTMA is receiver, the IoTMA takes the reported event as the primary cause.

In an exemplary embodiment, based on the event analysis, appropriate action may be taken as illustrated below:
  a. If IoT network is the receiver, then the IoT network takes appropriate actions as specified in the IoT network PCA table.
  b. If IoTGW is the receiver, then the IoTGW takes appropriate actions as specified in the IoTGW PCA table.
  c. If ICGW is the receiver, then the IoT network takes appropriate actions as specified in the ICGW PCA table.
  d. If IoTMA is receiver, then the IoTMA takes appropriate actions as specified in the IoTMA PCA table.

In an exemplary embodiment, based on the event analysis, appropriate action may be taken as illustrated below:
  a. If IoT network is the receiver, then the IoT network takes appropriate actions as specified in the IoT network PCA table.
  b. If IoTGW is the receiver, then the IoTGW takes appropriate actions as specified in the IoTGW PCA table.
  c. If ICGW is the receiver, then the IoT network takes appropriate actions as specified in the ICGW PCA table.
  d. If IoTMA is receiver, then the IoTMA takes appropriate actions as specified in the IoTMA PCA table.

Thus the actions flow in a hierarchical manner. For example, if IoT network is unable to take actions on its own, it reports to IoTGW which, in turn, could report it to ICGW. This process continues until the deciding entity is reached, which then triggers the action flow.

Once the communication session ends either normally (one or both parties signals an end of the session) or abnormally (for example, a forced termination of the session or abrupt disconnection), the IoTGW passes relevant information about the session to the IoTMA for updating its historical database. Such information may include, but is not limited to exceptions observed, delays, duration of the session, and resources used. The IoTMA then updates parameters such as success rate of a particular party to fulfill a communication request. The IoTGW and the ICGW then clean up the resources used for the session.

SSM module 326 also stores relevant information (collected locally or obtained from other sub-systems/components in ICGW 300B) about the session for future use. Such information may include, but is not limited to exceptions encountered, stability of network interfaces, delays, and bandwidth used. SSM module 326 then makes adjustments to the relevant configuration parameters (for example, % of stability of network interfaces). By way of an example, the adjustments could be made by filtering out the extreme new values first and then the adjusted value is computed as a simple average of existing and new values. By way of another example, the adjusted value can also be weighted average of all past values and the new value, or a weighted average over a moving window of fixed number of past samples and the new value.

Referring back to 404, if the existing communication session between the IoT device and the destination IoT device is suitable, then the existing communication session is reused for the communication request at 410. Thereafter, monitoring of parameters associated with the IoT network, the IoTGW, and the ICGW is initiated. This has been explained in detail above. In response to this, one or more initiating causes are iteratively determined for a communication event and associated resolutions on occurrence of the communication event to maintain the existing communication session. This has been explained in detail above.

Figure 5:
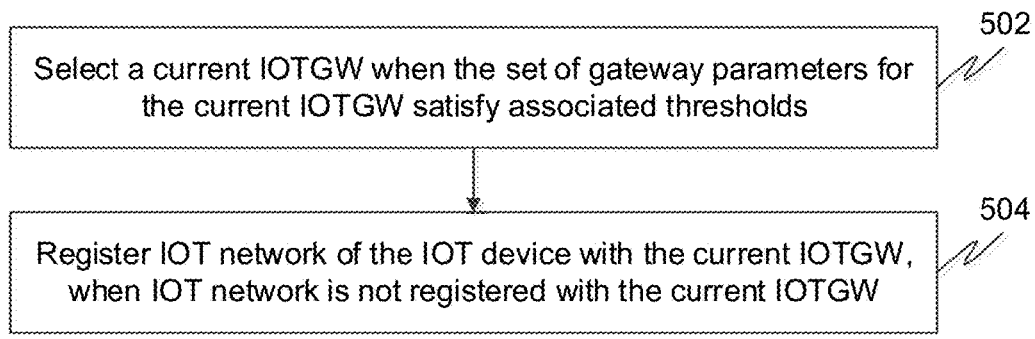
FIG. 5 illustrates a flowchart of a method for finalizing an IoT Gateway (IoTGW), in accordance with an embodiment.

Referring now to FIG. 5, a flowchart of a method for finalizing an IoTGW is illustrated, in accordance with an embodiment. At 502, a current IoTGW is selected, when the set of gateway parameters for the current IoTGW satisfy associated thresholds. In other words, it is checked, whether the current IoTGW is suitable. In an exemplary embodiment, suitability of the current IoTGW may be checked using the following method:
Check if two or more IoT devices have connectivity to the current IoTGW.
   If yes, proceed further, if no, then current IoTGW is not suitable.
   If power level of IoT network<Power level threshold
   Then
Check if IoTGW supports at least 1 low power connectivity option supported by the IoTN

|  | If yes, proceed further, if no, current IoTGW is not suitable. |
|---|---|
| Fi | |
| | If signal strength > Signal strength threshold |
| Then | |
| | Proceed further |
| Else | |
| | The current IoTGW is not suitable |
| Fi | |
| | If packet sending/reception delay < Delay threshold |
| Then | |
| | The current IoTGW is suitable |
| Else | |
| | The current IoTGW is not suitable |
| Fi | |

At 504, the IoT network of the IoT device is registered with the current IoTGW, when the IoT network is not registered with the current IoTGW. In an exemplary embodiment, after an IoT network sends a registration request to an IoTGW (which is the current IoTGW in this case), the registration may be performed using following method:

a. Authentication & Authorization:
    The IoT network and the IoTGW perform mutual authentication using standard or well-known mechanisms (this is applicable only in case of registration, and not applicable for re-registration). The IoTGW then checks for the authorization of the IoT network using standard or well-known mechanisms.
  b. Topology discovery:
    The IoTGW then discovers the topology of the IoT network. This includes aspects such as those listed below. If the IoTGW is not the Home IoTGW of the IoT network, then the extent of exposure/discovery of topology information might be limited to the current needs of the IoT network.
      i. IoT Device details (local ID, capability), their functions (criticality-priority), interrelationships between the devices, connectivity supported by the devices, location, etc.
  c. IoTMA Registration:
    The IoTGW then proceeds to register with the IoTMA. The identity of the IoTMA could be obtained from the IoT network, or from the NWDB 210, or available locally based on provisioned inputs. For example, in case of the home IoTGW, IoTMA related details may include security, authorization, criticality-priority. The IoTMA provides information about the IoTGW parameters to monitor and the associated thesholds to the IoT network via the IoTGW.
  d. Formulate IoT Network Context:
    The IoTGW then formulates the IoT network context based on inputs from IoTMA, inputs collected from the IoT network (for example, topology), and locally available data (provisioned and historical data).
  e. Update NWDB 210:
    IoTGW updates NWDB 210 of the associated IoTGW, registration status, etc. of the IoT network.
  f. Obtain information from the home IoTGW:
    If the current IoTGW is not the home IoTGW, the current IoTGW requests for additional information from the home IoTGW, for example, energy level, etc. depending on the information received from the IoTMA.
      i. Obtain IoTGW PCA table, IoT network PCA table, and ICGW PCA table updates:
        The IoTGW requests for the IoTGW PCA table, IoT network PCA table, and ICGW PCA table for the current IoT session to the IoTMA, along with the reference of the current table being used. The IoTMA provides the IoTGW PCA table, IoT network PCA table, and ICGW PCA table for the current IoT session.
        The IoTGW stores the received IoTGW PCA table locally. The IoTGW then provides the IoT network PCA table to the IoT network, which then stores the IoT network PCA table locally. The IoTGW also stores the ICGW PCA table locally.
  g. Handle HO:
    If a HO indication is received in the registration request from the IoT network along with the ICGW identity

```
Then
    If current IoTGW is registered with an ICGW
    Then
        Current IoTGW obtains relevant context information
        (IoT network topology, IoT functional session state,
        channel state) from the ICGW whose identity was
        received in the registration request from IOT network.
            - This would involve inter-ICGW
            communication if the identity of the ICGW
            received in the registration request is different
            from the ICGW with which the IoTGW is
            registered.
    Else
        Wait for completion of IoTGW to register with ICGW
        and then obtain relevant context information from the
        ICGW whose identity was received in the registration
        request from IOTN.
    Fi
Fi
```

Figure 6:
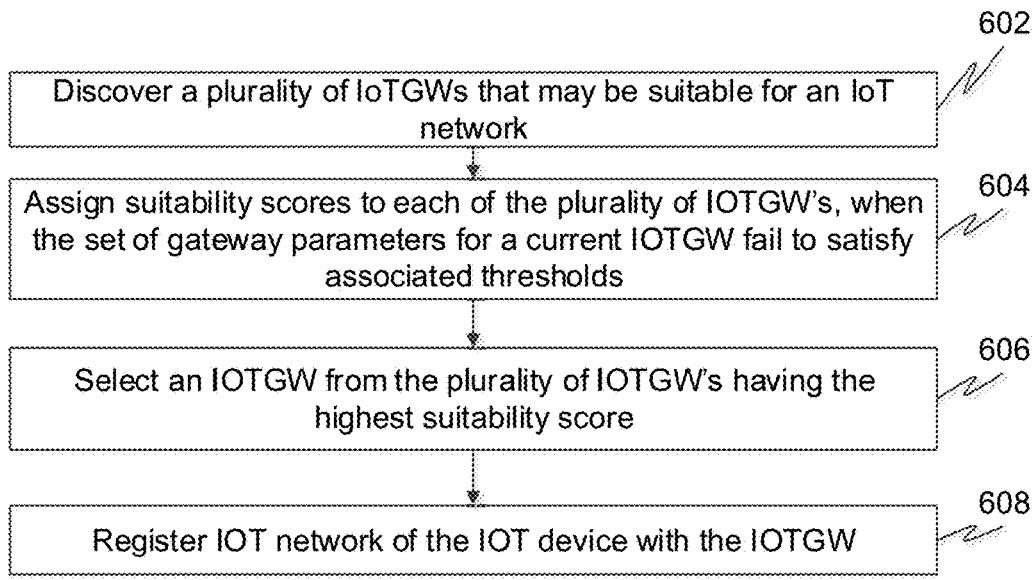
FIG. 6 illustrates a flowchart of a method for finalizing an IoTGW, in accordance with another embodiment.

Referring now to FIG. 6, a flowchart of a method for finalizing an IoTGW is illustrated, in accordance with another embodiment. At 602, a plurality of IoTGWs that may be suitable for an IoT network are discovered, if there is no IoTGW already connected with the IoT network and when the set of IoTGW parameters for a current IOTGW fail to satisfy associated thresholds. At 604, suitability scores are assigned to each of the plurality of IOTGW's. Thereafter, at 606, an IOTGW from the plurality of IOTGW's that has the highest suitability score is selected. In an exemplary embodiment, discovery of IoTGWs and determination of a suitable IoTGW may performed using the following method:

a. One or more IoT devices in the IOT network send a multicast/broadcast to learn the presence of IoTGW(s).
b. Once one or more IoTGWs respond, the IoT network determines which IoTGW is suitable as follows:
   i. Check if relevant IoTGW parameters are within associated thresholds for each IoTGW, based on the current energy level and security needs.
   ii. A suitability score is assigned based on the IoTGW parameters to each IoTGW whose IoTGW parameters are within associated thresholds.

| IoTGW | Suitability Score | Rank |
|---|---|---|
| 1 | 95 | 1 |
| 2 | 75 | 2 |
| 3 | 60 | 3 | iii. Choose the IoTGW with the highest suitability score/Rank

At 608, the IoT network of the IoT device is registered with the IoTGW selected. In an exemplary embodiment, registration may be performed using the exemplary method explained in FIG. 5 above.

Figure 7:
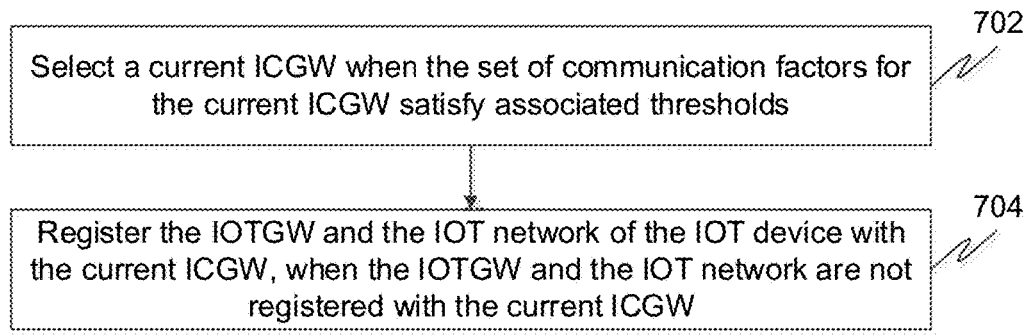
FIG. 7 illustrates a flow chart of a method for finalizing an ICGW, in accordance with an embodiment.

Referring now to FIG. 7, a flowchart of a method for finalizing an ICGW is illustrated, in accordance with an embodiment. If the finalized IoTGW is connected with an ICGW, and when the set of communication factors for a current ICGW satisfy associated thresholds, the current ICGW is selected at 702. In other words, it is checked whether the current ICGW is suitable or not. In an exemplary embodiment, the suitability of the current ICGW is checked by performing the following method:

a. The IoTGW collects information about the relevant communication factors for communicating with the ICGW and with other IoT networks.
b. The IoTGW then adapts the associated thresholds (received from the IoTMA) dynamically. For example:
   Threshold for Round-Trip-Delay (RTT) to ICGW=ICGW RTT threshold*alpha
      alpha=1.5, if speed of mobility is >100 km/hour=1.2, if speed of mobility is >50 km/hour and <=100 km/hr=1.2, if speed of mobility is >10 km/hour and <=50 km/hour=1.0 otherwise
   A similar logic could be applied for adapting other threshold, for example, jitter threshold.
c. The IoTGW then compares the communication factors with the adapted thresholds.
d. If the relevant communication factors are within associated thresholds, then IoTGW marks the current ICGW as suitable, else the IoTGW dissociates itself from the current ICGW by sending relevant information to the current ICGW At 704, the IoTGW and the IoT network of the IoT device are registered with the current ICGW, when the IoTGW and the IoT network are not registered with the current ICGW. In an exemplary embodiment, the registrations may be performed using the following method:

a. Registration of the IoTGW with an ICGW (which may be the current ICGW):
   i. The IoTGW sends a registration request to the ICGW.
   ii. The IoTGW and the current ICGW first perform mutual authentication using standard and well-known mechanisms. ADMSEC module 334 may perform this mutual authentication.
   iii. The IoTGW then sends relevant information to the current ICGW about connectivity options supported, whether it is mobile or stationary, capabilities, and IoT network currently registered with the IoTGW. The IoTGW also provides a HO indication to the ADMSEC module 334 in the current ICGW and the identity of the previously-associated ICGW, if it was already registered with the previously-associated ICGW and is now getting disassociated with it (IoTGW handover).
   iv. The IoTGW also sends the ICGW PCA table (received from the IOTMA earlier) to the ICGW, which is then stored locally by SSM module 308 for the IoT session.
   v. If a HO indication and previously-associated ICGW ID was received from the IoTGW, the ADMSEC module 334 in the current ICGW obtains relevant information (for example, session state, formulated policy, and entitlement) from SSM module 326 in the previously-associated ICGW. ADMSEC module 334 in the current ICGW then passes the obtained information to SSM module 334 and communication module 328 in the current ICGW. ADMSEC module 334 in the current ICGW then sends a registration confirmation to the IoTGW.
      1. If the previously associated ICGW is not reachable, then ADMSEC module 334 in the current ICGW obtains such information as stated above from NWDB 210 (if available).
   vi. The ICGW then updates its local database as well as NWDB 210.
a. Registration of IoT network with the ICGW (which may be the current ICGW):
   i. The IoTGW sends a request to SSM module 308 in an ICGW to register the IoT network together with the IoT network context.
   ii. SSM module 326 first obtains information about the IoT subscriber entitlement from MCN 208.

iii. If IoT Subscriber entitlement is present, then SSM module 326 obtains IoT network-specific entitlements from NWDB 210.
iv. If IoT network-specific entitlements are also present, SSM module 326 in the current ICGW requests the IDM 332 in the ICGW to assign a suitable ID for the IoT networks and the devices. The IDM 332 interacts with NWDB 210 to determine if the identities are already assigned for the particular IoT network and the home IoT gateway.

```
If IDs are not assigned
Then
    If current ICGW is the home ICGW
    Then
        The IDM 332 assigns the next available identity to
        the IoT network as a string consisting of the specific
        IoT subscriber, home IoT gateway, which is then
        encoded.
        The IDM 332 then proceeds to assign suitable
        identities to the IoT devices in the IoT network.
        The device identity is formed as a string consisting of
        subscriber ID, home IoTGW ID, IoT device type,
        IoTdevice ID, and it is then subsequently encoded
        appropriately.
    Else
        a. The IDM 332 in current ICGW requests the home
           ICGW to allocate suitable identities to the IoT
           network and the IoTGW.
        b. The IDM 332 in current ICGW allocates
           temporary-routing identities to enable reachability
           of the IoT network and IoTGW, and informs the
           home ICGW and NWDB 210.
    Fi
Else
    The IDM 332 in the current ICGW allocates temporary-
    routing identities to enable reachability of the IoT network
    and IoTGW, and informs the home ICGW and NWDB 210.
Fi
``` v. If a HO indication was received in the registration request from the IoTGW, SSM module 326 in the current ICGW requests for relevant information including session state, formulated policy, current entitlement, relevant IoT network topology aspects, from the previously-associated ICGW. If the previously-associated ICGW is not reachable, the current ICGW obtains information that is available in NWDB 210.
vi. SSM module 326 in the ICGW triggers policy module 330 in the ICGW with inputs such as IoT network topology, IoT subscriber entitlement, to formulate the communication policy for the IoT network.
vii. After formation of the communication policy, SSM module 326 in the ICGW sends a response to the IoTGW to confirm the registration, together with the identities assigned to the IoT network and the devices in the IoT network. Relevant information is then passed by the IoTGW to the IoTMA (for example, ICGW identity) and to the IoTN (for example, temporary/routing IDs).
viii. SSM module 326 in the ICGW also updates NWDB 210 about the current location of the IOT network, IoTGW and the IDs of the IoT network and the IoT devices.

Figure 8:
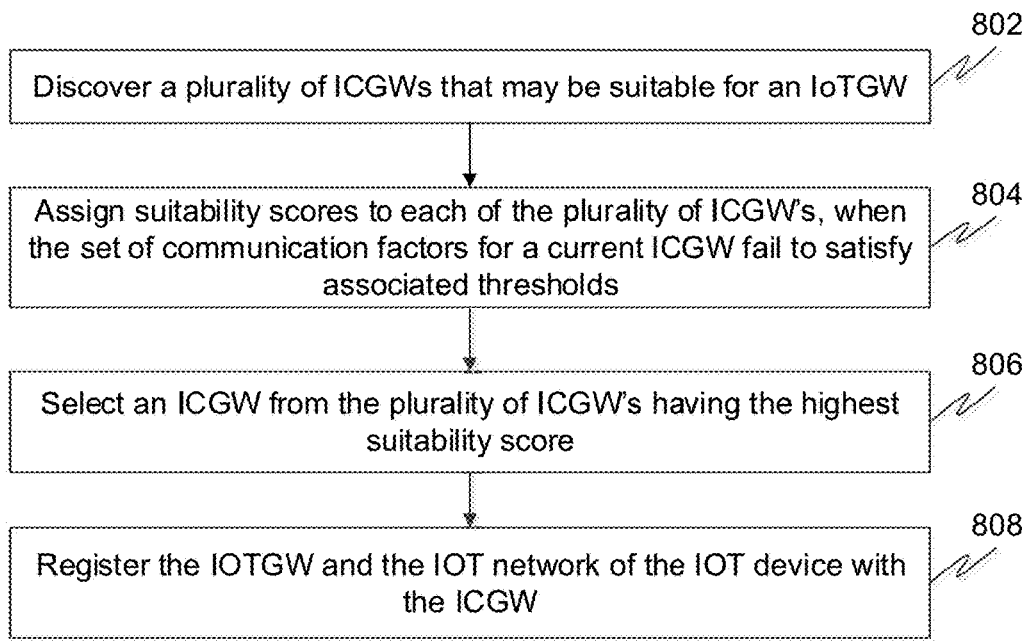
FIG. 8 illustrates a flow chart of a method for finalizing an ICGW, in accordance with another embodiment.

Referring now to FIG. 8, a flowchart of a method for finalizing an ICGW is illustrated, in accordance with another embodiment. At 802, a plurality of ICGWs that may be suitable for an IoTGW are discovered, if there is no ICGW already connected with the IoTGW and when the set of communication factors for a current ICGW fail to satisfy associated thresholds. At 804, suitability scores are assigned to each of the plurality of ICGW's. At 806, select an ICGW from the plurality of ICGW's having the highest suitability score. In an exemplary embodiment, discovery of ICGWs and determination of a suitable ICGW may performed using the following method:

a. IoTGW performs a discovery of the ICGW, for example, by sending a broadcast over all available communication interfaces (for example, WiFi, Bluetooth, etc.) to learn the presence of one or more ICGWs.
b. Once the presence of one or more ICGW is learnt, the IoTGW collects information about the communication factors and assesses the status of relevant communication factors with respect to associated thresholds, and also assesses the possibility of fulfilling the communication request by each of the discovered ICGWs.
c. If the relevant communication factors are within thresholds and if the particular ICGW can fulfill the communication request, then IoTGW marks the current ICGW as suitable. The IoTGW then determines the suitability score and ranks them in decreasing order of suitability score, for example, if there are four ICGWs:

| ICGW | Suitability Score | Rank | Remarks |
|---|---|---|---|
| ICGW3 | 90 | 1 | All mandatory communication factors OK, 1 optional communication factor Not OK |
| ICGW1 | 80 | 2 | All mandatory communication factors OK, 3 optional communication factors Not OK |
| ICGW4 | 78 | 3 | All mandatory communication factors OK, 3 optional communication factors Not OK, network conditions poorer than ICGW1 |
| ICGW2 | NA | NA (not suitable) | 1 mandatory communication factor Not OK |

The suitability score can be computed by assigning a score to each factor, and adding it when it is fulfilled. For threshold-related communication factors, a linear scale can be applied depending on the actual value if the actual value is less than threshold.
In the above Table, if we assume 10 communication factors, ICGW3 fulfills nine communication factors, and ICGW1 and ICGW4 fulfill eight communication factors.
ICGW4 has a lower suitability score than ICGW1 because the congestion level is poorer than ICGW1 even though both ICGW4 and ICGW1 have congestion level lower than congestion threshold.
d. IoTGW decides on the suitable ICGW by selecting the ICGW with the highest suitability score.

Thereafter, at 808, the IoTGW and the IoT network of the IoT device are registered with the ICGW finally selected at 806. In an exemplary embodiment, registration may be performed using the exemplary method explained in FIG. 7 above.

Figure 9:
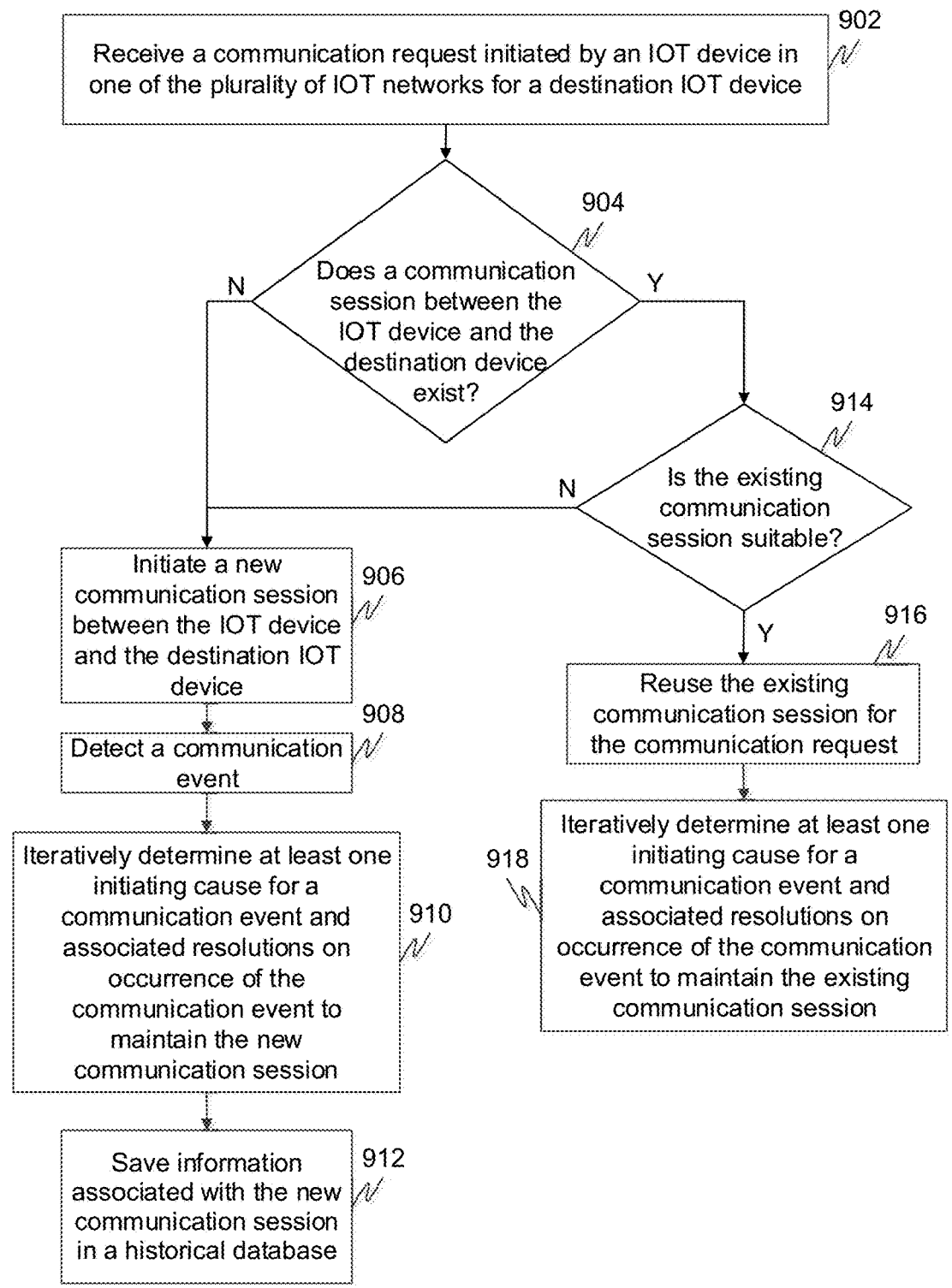
FIG. 9 illustrates a flow chart of a method for managing communication across a plurality of IoT networks, in accordance with another embodiment.

Referring now to FIG. 9, a flowchart of a method for managing communication across a plurality of IoT networks is illustrated, in accordance with another embodiment. At 902, a communication request initiated by an IoT device in one of the plurality of IoT networks for a destination IoT device is received. At 904, a check is performed to determine if a communication session exists between the IoT device and the destination IoT device. In absence of an existing communication session, a new communication session is initiated at 906 between the IoT device and the destination IoT device. After initiation of the communication session, communication events are detected at 908 as a result of initiation of monitoring of parameters associated with the IoT network, the IoTGW, and the ICGW. Thereafter, at 910, one or more initiating causes for a communication event and associated resolutions on occurrence of the communication event are iteratively determined to maintain the new communication session. This has been explained in detail in conjunction with FIGS. 4A and 4B. At 912, information associated with the new communication session in saved in a historical database. The information includes one or more of, but is not limited to observed exceptions, communication delays, duration of the new communication session, and resource utilization.

Referring back to 904, in presence of an existing communication session, a check is performed at 914 to determine if the existing communication session is suitable. If the existing communication session is not suitable, control goes back to 906. However, if the existing communication session is suitable, at 916, the existing communication session is reused for the communication request. Then, monitoring of parameters associated with the IoT network, the IoTGW, and the ICGW is initiated. In response to the same, at 918, one or more initiating causes for a communication event and associated resolutions on occurrence of the communication event are iteratively determined to maintain the existing communication session. This has been explained in detail in conjunction with FIGS. 4A and 4B

Figure 10:
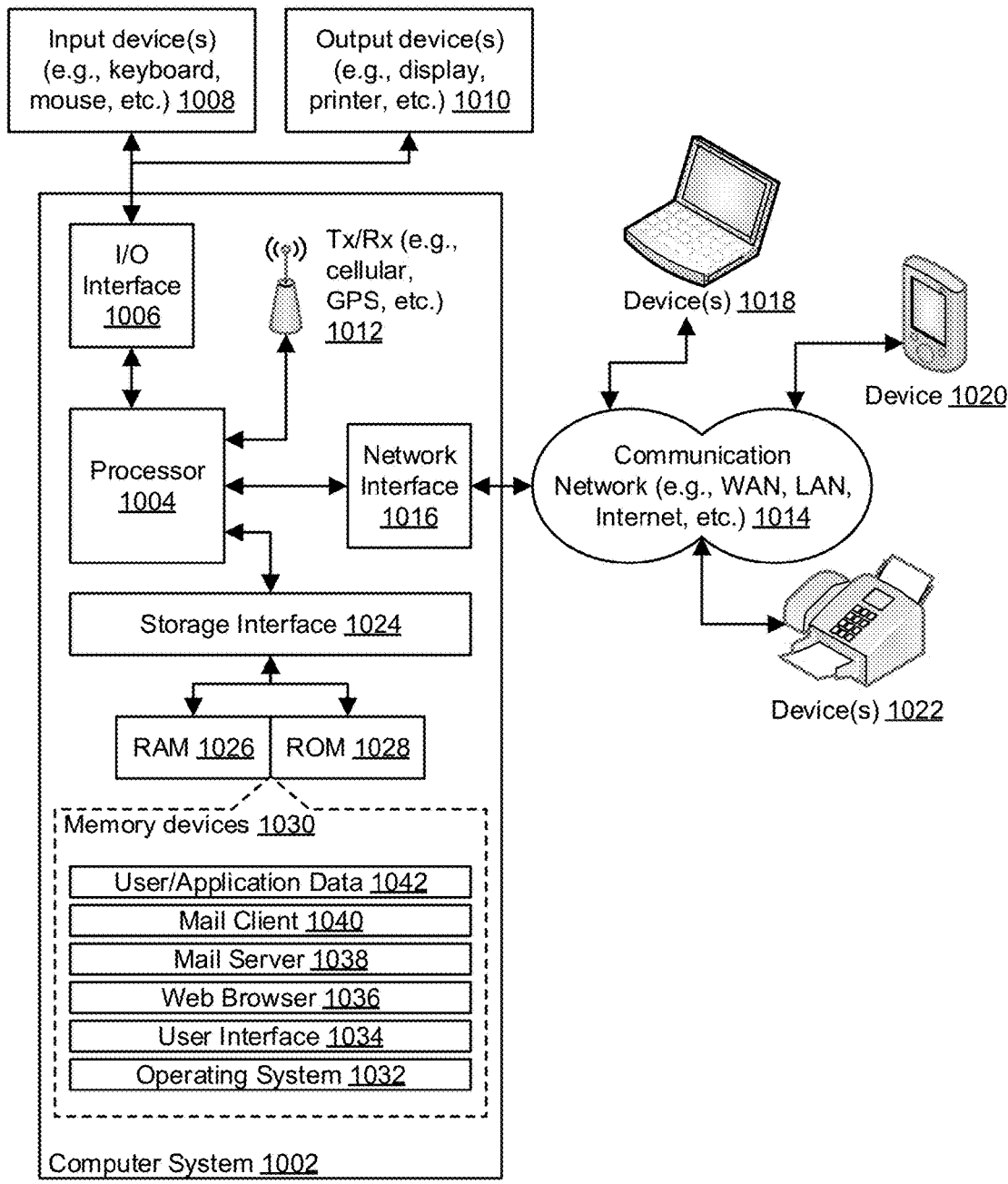
FIG. 10 illustrates a block diagram of an exemplary computer system for implementing various embodiments.

FIG. 10 is a block diagram of an exemplary computer system for implementing various embodiments. Computer system 1002 may comprise a central processing unit ("CPU" or "processor") 1004. Processor 1004 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 1004 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1004 may be disposed in communication with one or more input/output (I/O) devices via an I/O interface 1006. I/O interface 1006 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 1002.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 1006, computer system 1002 may communicate with one or more I/O devices. For example, an input device 1008 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 1010 may be a printer, fax machine, video display (e.g., cathode ray tube (CRT), liquid crystal display (LCD), light-emitting diode (LED), plasma, or the like), audio speaker, etc. In some embodiments, a transceiver 1012 may be disposed in connection with processor 1004. Transceiver 1012 may facilitate various types of wireless transmission or reception. For example, transceiver 1012 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 1004 may be disposed in communication with a communication network 1014 via a network interface 1016. Network interface 1016 may communicate with communication network 1014. Network interface 1016 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 1014 may include, without limitation, a direct interconnection, local area network (LAN), wide area network (WAN), wireless network (e.g., using Wireless Application Protocol), the Internet, etc. Using network interface 1016 and communication network 1014, computer system 1002 may communicate with devices 1018, 1020, and 1022. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 1002 may itself embody one or more of these devices.

In some embodiments, processor 1004 may be disposed in communication with one or more memory devices (e.g., RAM 1026, ROM 1028, etc.) via a storage interface 1024. Storage interface 1024 may connect to memory devices 1030 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 1030 may store a collection of program or database components, including, without limitation, an operating system 1032, a user interface application 1034, a web browser 1036, a mail server 1038, a mail client 1040, a user/application data 1042 (e.g., any data variables or data records discussed in this disclosure), etc. Operating system 1032 may facilitate resource management and operation of the computer system 1002. Examples of operating system 1032 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1034 may facilitate display, execution, interaction, manipulation, or operation of program components through textual or graphical facilities. For example, user interfaces may provide computer interaction interface elements on a display system operatively connected to computer system 1002, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 1002 may implement web browser 1036 stored program component. Web browser 1036 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 1002 may implement mail server 1038 stored program component. Mail server 1038 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 1002 may implement mail client 1040 stored program component. Mail client 1040 may be a mail viewing application, such as Apple Mail, Microsoft Entourage, Microsoft Outlook, Mozilla Thunderbird, etc.

In some embodiments, computer system 1002 may store user/application data 1042, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using Obj ectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described methods and systems for adaptive and context-aware IoT communication. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

The methods described may also be practiced in a distributed computing environment where functions are performed by remote processing devices that are linked through a communication network. In a distributed computing environment, computer executable instructions may be located in both local and remote computer storage media, including memory storage devices.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects and data structures.

It is intended that the disclosure and examples be considered as exemplary only, with a true scope and spirit of disclosed embodiments being indicated by the following claims.

What is claimed is:

1. A method for managing communication across a plurality of Internet of Things (IoT) networks, the method comprising:
receiving a communication request initiated by an IoT device in one of the plurality of IoT networks for a destination IoT device located in one of the plurality of IoT networks;

determining suitability of an existing communication session between the IoT device and the destination IoT device;

selectively initiating, based on determining unsuitability of the existing communication session, a new communication session between the IoT device and the destination IoT device, wherein initiating the new communication session comprises:

finalizing an IoT Gateway (IoTGW) for IoT network of the IoT device based on comparison of a set of gateway parameters with associated thresholds within a set of IoTGW thresholds in response to receiving a communication request;

determining priority, criticality, and resource requirement of the destination IoT device for the communication request based on a purpose of the communication request;

finalizing an Inter-Connect Gateway (ICGW) for the IoT network of the IoT device to communicate with the IoTGW based on comparison of a set of communication parameters with associated thresholds within a set of ICGW thresholds, wherein the ICGW communicates with a set of IoTGW's; and establishing the new communication session between the ICGW and the destination IoT device on a communication channel based on the priority and the criticality determined for the communication request;

selectively reusing, in response to determining suitability of the existing communication session, the existing communication session for the communication request;

iteratively determining at least one initiating cause for a communication event and associated resolutions on occurrence of the communication event to maintain one of the new communication session and the existing communication session that is suitable; and implementing a self-learning mechanism to improve the quality of future communication sessions.

2. The method of claim 1, wherein the finalizing the IoTGW comprises:

selecting a current IoTGW when the set of gateway parameters for the current IoTGW satisfy associated thresholds; and registering IoT network of the IoT device with the current IoTGW, when IoT network is not registered with the current IoTGW.

3. The method of claim 1, wherein the finalizing the IoTGW comprises:

assigning suitability scores to each of a plurality of IoTGW's, when the set of gateway parameters for a current IoTGW fail to satisfy associated thresholds, wherein the suitability scores are assigned based on comparison of the set of gateway parameters with associated thresholds for each of a plurality of IoTGW's;

selecting an IoTGW from the plurality of IoTGW's having the highest suitability score; and registering IoT network of the IoT device with the IoTGW.

4. The method of claim 1, wherein the determining the priority comprises:

searching an internal mapping table to determine mapping of the purpose with the priority; and determining existence of a preceding communication request between the IoT device and the destination IoT device, the communication request having dependency with purpose and state of the preceding communication request.

5. The method of claim 1, wherein the criticality of the communication request is determined based on at least one of the purpose of the communication request, type of the communication request, function of the IoT device, time of initiation of the communication request, age of the communication request, or the destination IoT device.

6. The method of claim 1, wherein the finalizing the ICGW comprises:

assigning suitability scores to each of a plurality of ICGW's, when the set of communication factors for a current ICGW fail to satisfy associated thresholds, wherein the suitability scores are assigned based on comparison of the set of communication factors with associated thresholds for each of a plurality of ICGW's;

selecting an ICGW from the plurality of ICGW's having the highest suitability score; and registering the IOTGW and the IoT network of the IoT device with the ICGW.

7. The method of claim 1, wherein the finalizing the ICGW comprises:

selecting a current ICGW when the set of communication factors for the current ICGW satisfy associated thresholds; and registering the IoTGW and the IoT network of the IoT device with the current ICGW, when the IoTGW and the IoT network are not registered with the current ICGW.

8. The method of claim 1, wherein the establishing the new communication session between the ICGW and the destination IoT device further comprises revising priority and criticality determined for the communication request based on pendency associated with completion of the communication request.

9. The method of claim 1, wherein the implementing the self-learning mechanism comprises:

saving information associated with the new communication session in a historical database, the information comprising at least one of observed exceptions, communication delays, duration of the new communication session, or resource utilization; and adapting the set of gateway parameters and the set of communication parameters using the information stored in the historical database.

10. The method of claim 1 further comprising:

determining presence of the existing communication session; and initiating the new communication session in absence of the existing communication session.

11. The method of claim 1, wherein the communication channel between the IoT device and the destination IoT device is routed through at least one of the IoT network of the IoT device, the IoTGW, the ICGW, the IoT network of the destination IoT device, an ICGW associated with the destination IoT device, or an IoTGW associated with the destination IoT device.

12. The method of claim 1 further comprising:

initiating monitoring parameters associated with an IoT network, the IoTGW, and the ICGW; and detecting a communication event in response to initiating monitoring, the communication event comprising unavailability of an IoTGW interface, absence of an acknowledgment for a critical communication, unavailability of an IoT network, unavailability of an ICGW, resource unavailability, hardware/software fault in an IoTGW, or power lapse in an IoTGW.

13. The method of claim 1, wherein the initiating cause comprises one of change in topology in an IoT network, change of location of an IoT network, interference, high traffic, weather condition, obstacles, low energy levels at an IoTGW, receipt of an unexpected packet, content adulteration, Man-in-the-middle (MITM) attack, priority or criticality NOK, poor signal strength, mobility of IoTGW, issues associated with a Macro Core Network (MCN), issues associated with interface of the MCN, or IoT network subscriber entitlement.

14. A system for managing communication across a plurality of Internet of Things (IoT) networks, the system comprising at least one network device comprising:
    at least one processor; and
    a memory storing instructions that, when executed by the at least one processor, cause the at least one processor to perform operations comprising:
        receiving a communication request initiated by an IoT device in one of the plurality of IoT networks for a destination IoT device located in one of the plurality of IoT networks;
        determining suitability of an existing communication session between the IoT device and the destination IoT device;
        selectively initiating, based on determining unsuitability of the existing communication session, a new communication session between the IoT device and the destination IoT device, wherein initiating the new communication session comprises:
            finalizing an IoT Gateway (IoTGW) for IoT network of the IoT device based on comparison of a set of gateway parameters with associated thresholds within a set of IoTGW thresholds in response to receiving a communication request;
            determining priority, criticality, and resource requirement of the destination IoT device for the communication request based on a purpose of the communication request;
            finalizing an Inter-Connect Gateway (ICGW) for the IoT network of the IoT device to communicate with the IoTGW based on comparison of a set of communication parameters with associated thresholds within a set of ICGW thresholds, wherein the ICGW communicates with a set of IoTGW's; and
            establishing the new communication session between the ICGW and the destination IoT device on a communication channel based on the priority and the criticality determined for the communication request;
        selectively reusing, in response to determining suitability of the existing communication session, the existing communication session for the communication request;
        iteratively determining at least one initiating cause for a communication event and associated resolutions on occurrence of the communication event to maintain one of the new communication session and the existing communication session that is suitable; and
        implementing a self-learning mechanism to improve the quality of future communication sessions.

15. The system of claim 14, wherein the finalizing the IoTGW further comprises:
    selecting a current IoTGW when the set of gateway parameters for the current IoTGW satisfy associated thresholds; and
    registering IoT network of the IoT device with the current IoTGW, when IoT network is not registered with the current IoTGW.

16. The system of claim 14, wherein the finalizing the IoTGW further comprises:
    assigning suitability scores to each of a plurality of IoTGW's, when the set of gateway parameters for a current IoTGW fail to satisfy associated thresholds, wherein the suitability scores are assigned based on comparison of the set of gateway parameters with associated thresholds for each of a plurality of IoTGW's;
    selecting an IoTGW from the plurality of IoTGW's having the highest suitability score; and
    registering IoT network of the IoT device with the IoTGW.

17. The system of claim 14, wherein the determining the priority comprises:
    searching an internal mapping table to determine mapping of the purpose with the priority; and
    determining existence of a preceding communication request between the IoT device and the destination IoT device, the communication request having dependency with purpose and state of the preceding communication request.

18. The system of claim 14, wherein the criticality of the communication request is determined based on at least one of the purpose of the communication request, type of the communication request, function of the IoT device, time of initiation of the communication request, age of the communication request, or the destination IoT device.

19. The system of claim 14, wherein the selecting the ICGW further comprises the operation of dynamically adapting the set of ICGW thresholds based on network parameters.

20. The system of claim 14, wherein the finalizing the ICGW further comprises:
    assigning suitability scores to each of a plurality of ICGW's, when the set of communication factors for a current ICGW fail to satisfy associated thresholds, wherein the suitability scores are assigned based on comparison of the set of communication factors with associated thresholds for each of a plurality of ICGW's; and
    selecting an ICGW from the plurality of ICGW's having the highest suitability score; and
    registering the IOTGW and the IoT network of the IoT device with the ICGW.

21. The system of claim 14, wherein the finalizing the ICGW further comprises:
    selecting a current ICGW when the set of communication factors for the current ICGW satisfy associated thresholds; and
    registering the IoTGW and the IoT network of the IoT device with the current ICGW, when the IoTGW and the IoT network are not registered with the current ICGW.

22. The system of claim 14, wherein the establishing the new communication session between the ICGW and the destination IoT device further comprises revising priority and criticality determined for the communication request based on pendency associated with completion of the communication request.

23. The system of claim 14, wherein the implementing the self-learning mechanism further comprises:
    saving information associated with the new communication session in a historical database, the information comprising at least one of observed exceptions, communication delays, duration of the new communication session, or resource utilization; and adapting the set of gateway parameters and the set of communication parameters using the information stored in the historical database.

24. The system of claim 14, further comprising:

determining presence of the existing communication session; and initiating the new communication session in absence of the existing communication session.

25. The system of claim 14, wherein the communication channel between the IoT device and the destination IoT device is routed through at least one of the IoT network of the IoT device, the IoTGW, the ICGW, the IoT network of the destination IoT device, an ICGW associated with the destination IoT device, or an IoTGW associated with the destination IoT device.

26. The system of claim 14, further comprising:

initiating monitoring parameters associated with an IoT network, the IoTGW, and the ICGW; and detecting a communication event in response to initiating monitoring, a communication event is selected from a group comprising unavailability of an IoTGW interface, absence of an acknowledgment for a critical communication, unavailability of an IoT network, unavailability of an ICGW, resource unavailability, hardware/software fault in an IoTGW, power lapse in an IoTGW.

27. The system of claim 14, wherein the at least one initiating cause comprises one of change in topology in an IoT network, change of location of an IoT network, interference, high traffic, weather condition, obstacles, low energy levels at an IoTGW, receipt of an unexpected packet, content adulteration, Man-in-the-middle (MITM) attack, priority or criticality NOK, poor signal strength, mobility of IoTGW, issues associated with a Macro Core Network (MCN), issues associated with interface of the MCN, or IoT network subscriber entitlement.

* * * * *